US010061476B2

(12) United States Patent
Fuzell-Casey

(10) Patent No.: US 10,061,476 B2
(45) Date of Patent: Aug. 28, 2018

(54) SYSTEMS AND METHODS FOR IDENTIFYING, SEARCHING, ORGANIZING, SELECTING AND DISTRIBUTING CONTENT BASED ON MOOD

(71) Applicant: Aperture Investments, LLC, Mercer Island, WA (US)

(72) Inventor: Jacquelyn Fuzell-Casey, Mercer Island, WA (US)

(73) Assignee: APERTURE INVESTMENTS, LLC, Mercer Island, WA (US)

( * ) Notice: Subject to any disclaimer, the term of this patent is extended or adjusted under 35 U.S.C. 154(b) by 435 days.

(21) Appl. No.: 14/603,324

(22) Filed: Jan. 22, 2015

(65) Prior Publication Data

US 2015/0134654 A1 May 14, 2015

Related U.S. Application Data

(63) Continuation-in-part of application No. 13/828,656, filed on Mar. 14, 2013, now Pat. No. 9,639,871.

(60) Provisional application No. 61/930,442, filed on Jan. 22, 2014, provisional application No. 61/930,444, filed on Jan. 22, 2014.

(51) Int. Cl.
*G06F 17/30* (2006.01)
*G06F 3/0482* (2013.01)

(52) U.S. Cl.
CPC ...... *G06F 3/0482* (2013.01); *G06F 17/30023* (2013.01)

(58) Field of Classification Search
CPC ......... G06F 17/30867; G06F 17/30876; G06F 3/0482
See application file for complete search history.

(56) References Cited

U.S. PATENT DOCUMENTS 5,561,649 A 10/1996 Lee
6,151,571 A 11/2000 Pertrushin
6,411,289 B1 6/2002 Zimmerman
(Continued)

OTHER PUBLICATIONS www.picitup.com; Picitup's; PicColor product; copyright 2007-2010; accessed Feb. 2, 2015; 1 page.
(Continued)

*Primary Examiner* — Andrey Belousov
*Assistant Examiner* — Seth Adam Silverman
(74) *Attorney, Agent, or Firm* — Baker & Hostetler LLP

(57) ABSTRACT

Systems and methods for content identification, selection, organization and distribution are described. Content is identified or represented by one or more moods conveyed by the content to users. Once moods are identified for the content, the content can be searched based on those moods using ranges or sensory perception. Range-based searches are performed by looking for content having corresponding ranges and ranked based on the level of correspondence. Sensory mood searches are based on a user's association with the sensory information provided. Negative limitations may be used to exclude certain content that might otherwise be ranked based on the level of correspondence. Different types of content may be presented to users through a variety of different interfaces that are appropriate for the content. Distribution of content may be structured based on the moods associated with the content.

20 Claims, 13 Drawing Sheets

(56) References Cited

U.S. PATENT DOCUMENTS

| | | |
|---|---|---|
| 6,464,585 B1 | 10/2002 | Miyamoto et al. |
| 6,539,395 B1 | 3/2003 | Gjerdingen et al. |
| 6,657,117 B2 | 12/2003 | Weare et al. |
| 6,748,395 B1 | 6/2004 | Picker |
| 6,964,023 B2 | 11/2005 | Maes et al. |
| 6,993,532 B1 | 1/2006 | Platt |
| 7,022,907 B2 | 4/2006 | Lu |
| 7,024,424 B1 | 4/2006 | Platt |
| 7,080,324 B1 | 7/2006 | Nelson et al. |
| 7,115,808 B2 | 10/2006 | Lu et al. |
| 7,205,471 B2 | 4/2007 | Looney |
| 7,206,775 B2 | 4/2007 | Kaiser |
| 7,227,074 B2 | 6/2007 | Ball |
| 7,233,684 B2 | 6/2007 | Fedorovskaya et al. |
| 7,296,031 B1 | 11/2007 | Platt |
| 7,396,990 B2 | 7/2008 | Lu |
| 7,424,447 B2 | 9/2008 | Fuzell-Casey |
| 7,427,708 B2 | 9/2008 | Ohmura |
| 7,485,796 B2 | 2/2009 | Myeong |
| 7,541,535 B2 | 6/2009 | Ball |
| 7,562,032 B2 | 7/2009 | Abbosh |
| 7,582,823 B2 | 9/2009 | Kim |
| 7,626,111 B2 | 12/2009 | Kim |
| 7,756,874 B2 | 7/2010 | Hoekman et al. |
| 7,765,491 B1 | 7/2010 | Cotterill |
| 7,786,369 B2 | 8/2010 | Eom |
| 7,809,793 B2 | 10/2010 | Kimura |
| 7,822,497 B2 | 10/2010 | Wang |
| 7,858,868 B2 | 12/2010 | Kemp |
| 7,921,067 B2 | 4/2011 | Kemp et al. |
| 8,013,230 B2 | 9/2011 | Eggink |
| 8,229,935 B2 | 7/2012 | Lee |
| 8,248,436 B2 | 8/2012 | Kemp |
| 8,260,778 B2 | 9/2012 | Ghatak |
| 8,269,093 B2 | 9/2012 | Naik |
| 8,346,801 B2 | 1/2013 | Hagg |
| 8,354,579 B2 | 1/2013 | Park |
| 8,390,439 B2 | 3/2013 | Cruz-Hernandez et al. |
| 8,407,224 B2 | 3/2013 | Bach |
| 8,410,347 B2 | 4/2013 | Kim |
| 8,505,056 B2 | 8/2013 | Cannistraro |
| 8,686,270 B2 | 4/2014 | Eggink |
| 8,688,699 B2 | 4/2014 | Eggink |
| 8,855,798 B2 | 10/2014 | Dimaria et al. |
| 8,965,766 B1 | 2/2015 | Weinstein et al. |
| 9,165,255 B1 | 10/2015 | Shetty et al. |
| 9,195,649 B2 | 11/2015 | Neuhasuer et al. |
| 9,788,777 B1 | 10/2017 | Knight et al. |
| 9,830,896 B2 | 11/2017 | Wang et al. |
| 9,842,146 B2 | 12/2017 | Chen et al. |
| 2003/0045953 A1 | 3/2003 | Weare |
| 2003/0133700 A1 | 7/2003 | Uehara |
| 2003/0221541 A1 | 12/2003 | Platt |
| 2005/0065781 A1 | 3/2005 | Tell et al. |
| 2005/0109194 A1 | 5/2005 | Gayama |
| 2005/0109195 A1 | 5/2005 | Haruyama et al. |
| 2005/0211071 A1 | 9/2005 | Lu et al. |
| 2005/0234366 A1 | 10/2005 | Heinz et al. |
| 2005/0241465 A1 | 11/2005 | Goto |
| 2006/0047649 A1* | 3/2006 | Liang ............... G06F 17/30864 |
| 2006/0096447 A1 | 5/2006 | Weare et al. |
| 2006/0143647 A1 | 6/2006 | Bill |
| 2006/0170945 A1 | 8/2006 | Bill |
| 2007/0079692 A1 | 4/2007 | Glatt |
| 2007/0113725 A1 | 5/2007 | Oliver et al. |
| 2007/0113726 A1 | 5/2007 | Oliver et al. |
| 2007/0131096 A1 | 6/2007 | Lu et al. |
| 2008/0021851 A1 | 1/2008 | Alcalde et al. |
| 2008/0040362 A1 | 2/2008 | Aucouturier et al. |
| 2008/0184167 A1* | 7/2008 | Berrill ............... G06F 3/04847 |
| | | 715/833 |
| 2008/0189754 A1 | 8/2008 | Yoon et al. |
| 2008/0235284 A1 | 9/2008 | Aarts et al. |
| 2008/0253695 A1 | 10/2008 | Sano et al. |
| 2008/0300702 A1 | 12/2008 | Gomez et al. |
| 2008/0314228 A1 | 12/2008 | Dreyfuss et al. |
| 2009/0069914 A1 | 3/2009 | Kemp |
| 2009/0071316 A1 | 3/2009 | Oppenheimer |
| 2009/0182736 A1 | 7/2009 | Ghatak |
| 2009/0234888 A1 | 9/2009 | Holmes |
| 2010/0011388 A1 | 1/2010 | Bull |
| 2010/0042932 A1 | 2/2010 | Lehtiniemi |
| 2010/0053168 A1 | 3/2010 | Kemp |
| 2010/0086204 A1 | 4/2010 | Lessing |
| 2010/0091138 A1 | 4/2010 | Nair |
| 2010/0094441 A1 | 4/2010 | Mochizuki |
| 2010/0223128 A1 | 9/2010 | Dukellis |
| 2010/0223223 A1 | 9/2010 | Sandler et al. |
| 2010/0253764 A1 | 10/2010 | Sim |
| 2010/0260363 A1 | 10/2010 | Glatt et al. |
| 2010/0325135 A1 | 12/2010 | Chen et al. |
| 2011/0112671 A1 | 5/2011 | Weinstein |
| 2011/0184539 A1 | 7/2011 | Agevik |
| 2011/0191674 A1 | 8/2011 | Rawley et al. |
| 2011/0202567 A1 | 8/2011 | Bach |
| 2011/0239137 A1 | 9/2011 | Bill |
| 2011/0242128 A1 | 10/2011 | Kang |
| 2011/0252947 A1 | 10/2011 | Eggink |
| 2011/0252951 A1 | 10/2011 | Leavitt et al. |
| 2011/0271187 A1 | 11/2011 | Sullivan et al. |
| 2011/0289075 A1 | 11/2011 | Nelson |
| 2011/0314039 A1 | 12/2011 | Zheleva |
| 2012/0090446 A1 | 4/2012 | Moreno et al. |
| 2012/0132057 A1 | 5/2012 | Kristensen |
| 2012/0172059 A1 | 7/2012 | Kim |
| 2012/0179693 A1 | 7/2012 | Knight |
| 2012/0179757 A1 | 7/2012 | Jones |
| 2012/0197897 A1 | 8/2012 | Knight |
| 2012/0226706 A1 | 9/2012 | Choi |
| 2012/0260789 A1 | 10/2012 | Ur et al. |
| 2012/0296908 A1 | 11/2012 | Bach |
| 2013/0032023 A1 | 2/2013 | Pulley et al. |
| 2013/0086519 A1* | 4/2013 | Fino ............... G06Q 30/02 |
| | | 715/810 |
| 2013/0138684 A1 | 5/2013 | Kim et al. |
| 2013/0167029 A1 | 6/2013 | Friesen et al. |
| 2013/0173526 A1 | 7/2013 | Wong et al. |
| 2013/0178962 A1 | 7/2013 | DiMaria et al. |
| 2013/0204878 A1 | 8/2013 | Kim |
| 2013/0205223 A1 | 8/2013 | Gilbert |
| 2013/0247078 A1* | 9/2013 | Nikankin ......... H04N 21/44204 |
| | | 725/13 |
| 2014/0052731 A1 | 2/2014 | Dahule |
| 2014/0080606 A1 | 3/2014 | Gillet et al. |
| 2014/0085181 A1 | 3/2014 | Roseway et al. |
| 2014/0094156 A1 | 4/2014 | Uusitalo et al. |
| 2014/0180673 A1 | 6/2014 | Neuhauser et al. |
| 2014/0282237 A1 | 9/2014 | Fuzell-Casey |
| 2014/0310011 A1 | 10/2014 | Biswas et al. |
| 2014/0372080 A1 | 12/2014 | Chu |
| 2015/0078583 A1 | 3/2015 | Ball et al. |
| 2015/0081064 A1 | 3/2015 | Ball et al. |
| 2015/0081065 A1 | 3/2015 | Ball et al. |
| 2015/0081613 A1 | 3/2015 | Ball et al. |
| 2015/0134654 A1 | 5/2015 | Fuzell-Casey |
| 2015/0179156 A1 | 6/2015 | Uemura et al. |
| 2015/0205864 A1 | 7/2015 | Fuzell-Casey et al. |
| 2015/0220633 A1 | 8/2015 | Fuzell-Casey et al. |
| 2016/0125863 A1 | 5/2016 | Henderson |
| 2016/0203805 A1 | 7/2016 | Strachan |
| 2016/0329043 A1 | 11/2016 | Kim et al. |
| 2016/0372096 A1 | 12/2016 | Lyske |
| 2017/0091983 A1 | 3/2017 | Sebastian et al. |
| 2017/0103740 A1 | 4/2017 | Hwang et al. |
| 2017/0206875 A1 | 7/2017 | Hwang et al. |
| 2017/0330540 A1 | 11/2017 | Quattro et al. |
| 2018/0033416 A1 | 2/2018 | Neuhauser et al. |
| 2018/0047372 A1 | 2/2018 | Scallie et al. |
| 2018/0049688 A1 | 2/2018 | Knight et al. |
| 2018/0053261 A1 | 2/2018 | Hershey |

(56) References Cited

OTHER PUBLICATIONS http://labs.tineye.com; Multicolor; Idee Inc.; copyright 2015; accessed Feb. 2, 2015, 1 page.
http://statisticbrain.com/attention-span-statistics/; Statistics Brain; Statistic Brain Research Institute; accessed Feb. 2, 2015; 4 pages.
Dukette et al.; "The Essential 20: Twenty Components of an Excellent Health Care Team"; RoseDog Books; 2009; p. 72-73.

* cited by examiner

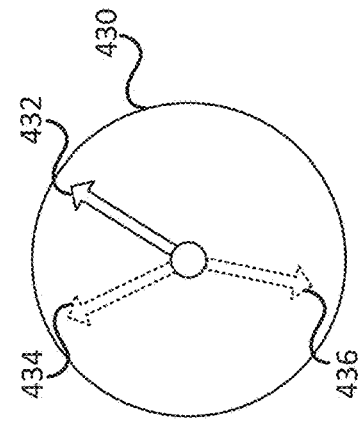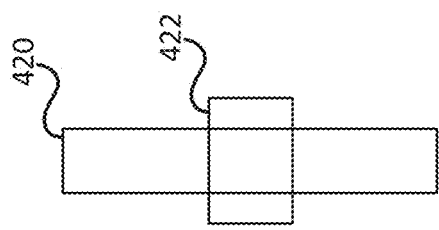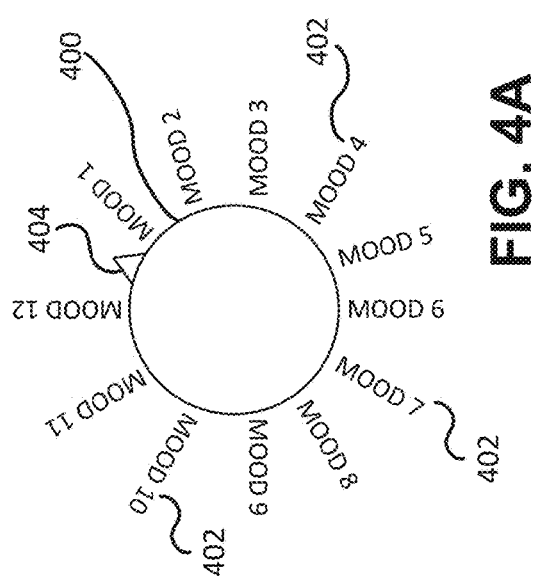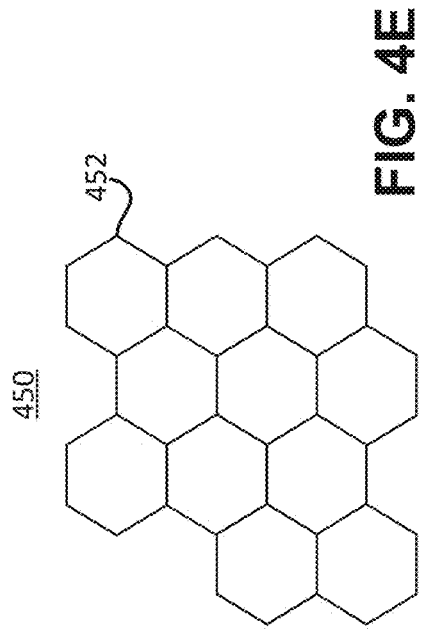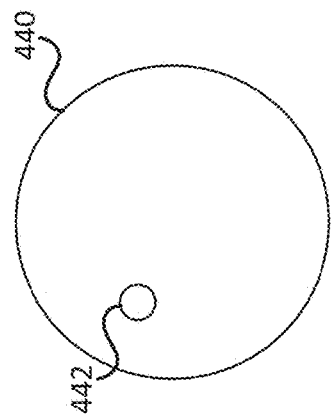
FIG. 4C
FIG. 4E
FIG. 4B
FIG. 4A
FIG. 4D

FIG. 8
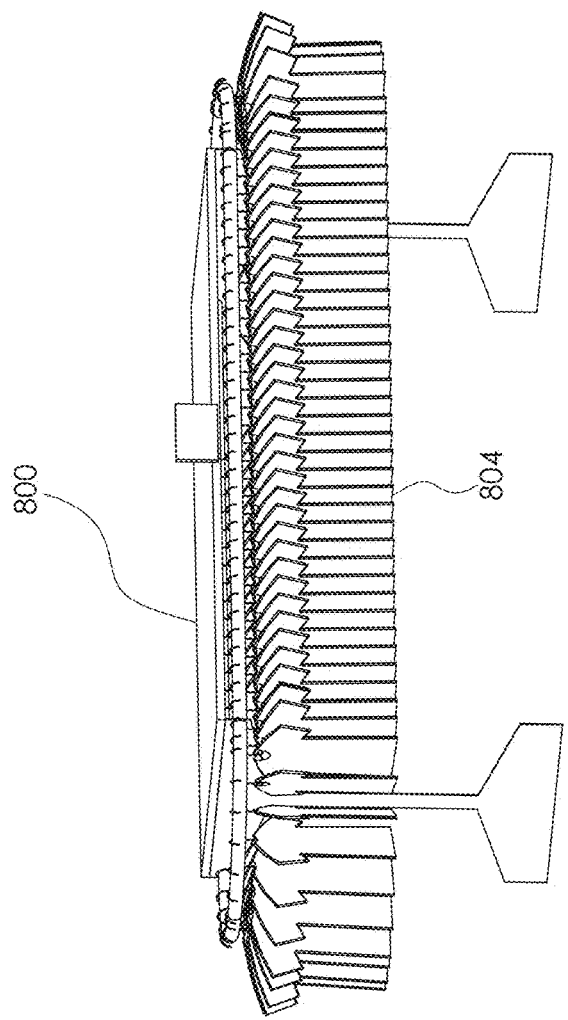
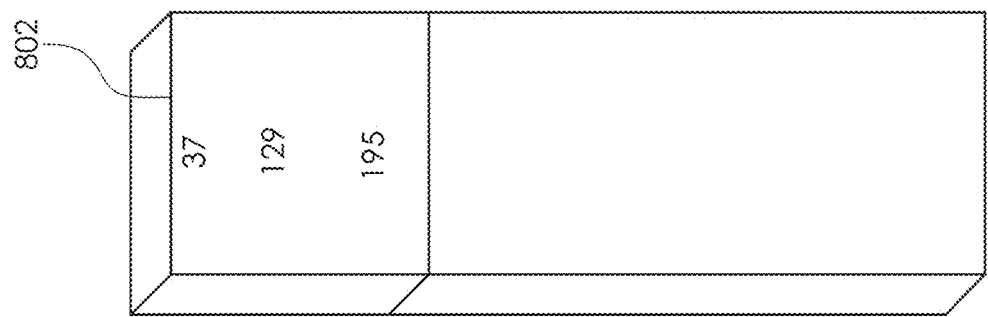

SYSTEMS AND METHODS FOR IDENTIFYING, SEARCHING, ORGANIZING, SELECTING AND DISTRIBUTING CONTENT BASED ON MOOD

RELATED APPLICATIONS

This application is a continuation-in-part of U.S. patent application Ser. No. 13/828,656 filed Mar. 14, 2013, and claims benefit under 35 U.S.C. § 119(e) of Provisional U.S. Patent Application No. 61/930,442, filed Jan. 22, 2014, and of Provisional U.S. Patent Application No. 61/930,444, filed Jan. 22, 2014, the entire contents of each of which are incorporated herein by reference.

This application is related by priority and subject matter to U.S. patent application Ser. No. 14/603,325, filed Jan. 22, 2015.

BACKGROUND

Traditional search engines, such as Web search engines, typically work by storing information about web pages retrieved by web crawlers or spiders and analyzing the content of those pages to determine how each page should be indexed. For example, words can be extracted from the titles, content, headings, or meta tags of the pages. Data about the web pages are then stored in an index database for use in later queries. A query can be a single word.

When a user enters a query into a search engine (typically by using keywords), the engine examines its index and provides a listing of best-matching web pages according to its criteria, usually with a short summary containing the document's title and sometimes parts of the text or an image. The index is built from the information stored with the data and the method by which the information is indexed. Some search engines allow users to search by date or to search before, after or during certain periods of time, based on dates found in the web pages or when the web pages were indexed.

Most search engines support the use of Boolean operators to further specify the search query. Boolean operators are for literal searches that allow the user to refine and extend the terms of the search. The engine looks for the words or phrases exactly as entered. Some search engines support proximity search, which allows users to define the distance between keywords, and concept-based searching, which involves the use of statistical analysis on web pages containing searched for words or phrases. Natural language queries allow the user to type a question in the same form a user might ask the question to a human. The search engine then parses the question to identify key words and may construct its own Boolean query based on the key words and their association with one another.

Since the usefulness of a search engine depends on the relevance of the results it generates, most search engines employ various methods for determining which web pages that match the search terms are more relevant, popular, or authoritative than others, with the former being ranked before the latter. How a search engine decides which pages are the best matches, and what order the results should be shown in, varies widely from one search engine to another, but two main systems have emerged. One employs predefined and hierarchically ordered keywords that humans have programmed extensively while the other generates an inverted index by analyzing texts it locates.

A text-based search engine cannot, however, search for text that is not there, so a text-based search engine would not be able to index and search photos, videos and many other types of content unless such content were also associated with words. A number of color-based search engines have been developed to help improve image searching. For example, Picitup's PICCOLR product (Mar. 14, 2013 www.picitup.com) is a visual search engine that allows images to be searched for specific colors selected from a color palette. Picitup's Multicolor Flickr search allows users to search for the combination of a single color and a limited number of shapes, but not words. For example, a user could select the color "orange" and a "star" shape and possibly get an image of an orangish, star-shaped starfish as a result. Shapes are identified through image recognition software. MULTICOLR by Idee Inc. (Mar. 14, 2013 http://labs.tineye.com) is another visual search engine that allows a user to select multiple colors from a palette, such as both orange and yellow, but does not combine these color searches with text searching. Etsy, an online shop for handmade products, has a color search option that is combined with words in a limited manner. For example, a user could first select a color of interest, such as "green," then enter a key word, such as "glove," and be returned numerous gloves that include the color green in some manner, i.e., that match the key word and include the selected color.

Other content search methods, such as search engines used to select movies, music, books, etc., on various websites include preloaded information about the content, such as action, thriller, non-fiction, jazz, etc. If a user enters the word "action" on a movie website, then the user would get a listing of movies considered to be "action" movies. Such content is usually categorized within a narrow range of choices and users can only search for content that falls within those specific categories. For example, if a user wants to search for something like action, but which is not exactly action, the user will have to pick one of the other category tags, such as comedy, thriller, etc.; there is no option for picking a range around the idea of action because words are too precise for an unspecific search. Likewise, some content, such as movies, may be rated according to whether people liked the movie, with a well-liked movie getting five stars, or some similar rating, and unliked movies getting one star or no stars. Users can then search for movies that have more than a certain number of stars, such as no movies with less than three stars. In such cases, the stars have nothing to do with the content of the movie itself, but rather only people's opinion of that movie.

Many other forms of content have limited criteria by which such content can be searched. For example, whether through the Internet, automotive magazines, consumer product publications, car buyer guides, etc., there are a limited number of ways in which a user can search for a desired automobile, such as make, model, engine type or size, color, type (sport, family, utility, etc.). The same is true for many other types of content, whether clothing, food, pets, etc., that do not enable users to search for such content based on the mood that such content may convey.

In addition, according to the Associated Press, the average attention span of an adult human had dropped from 12 seconds in 2000 to 8 seconds in 2012, which was just below that of a gold fish. In addition to noting the percentage of people who manage to forget their own birthdays, it was noted that the average length of time spent watching a single Internet video was only 2.7 minutes. "Attention Span Statistics—Statistic Brain." 2012 Statistic Brain Research Institute, publishing as Statistic Brain. Apr. 28, 2013. http://statisticbrain.com/attention-span-statistics/.

This does not mean, however, that the average length of Internet videos is only 2.7 minutes; the videos were likely much longer. Rather, the average person could only maintain their attention on a longer video for about 3 minutes. How is it possible, then, when a human's attention span is so short, that they can manage to pay attention to anything for more than 2.7 minutes? The answer apparently lies in each human's ability to refocus on the subject at hand, repeatedly, which enables humans to "pay attention" for slightly longer to much longer periods of time. Dianne Dukette; David Cornish (2009). *The Essential 20: Twenty Components of an Excellent Health Care Team*. RoseDog Books. pp. 72-73.

SUMMARY

Systems and methods for content identification, selection, organization and distribution are described. Embodiments enable content to be identified or represented by one or more moods conveyed by the content to users. Once moods are identified for the content, the content can be searched based on those moods using ranges or other tools. Searches are performed by looking for content having corresponding ranges and ranked based on the level of correspondence. Negative limitations may be used to exclude certain content that might otherwise be ranked based on the level of correspondence. Different types of content may be presented to users through a variety of different interfaces that are appropriate for the content. Distribution of content may be structured based on the moods associated with the content.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIGS. 4A, 4B, 4C, 4D and 4E illustrate embodiments of user interfaces for mood identification tools and/or a span selection tools.

FIG. 8 illustrates an embodiment of a mood-based clothing selector.

DETAILED DESCRIPTION OF ILLUSTRATIVE EMBODIMENTS

Figure 1:
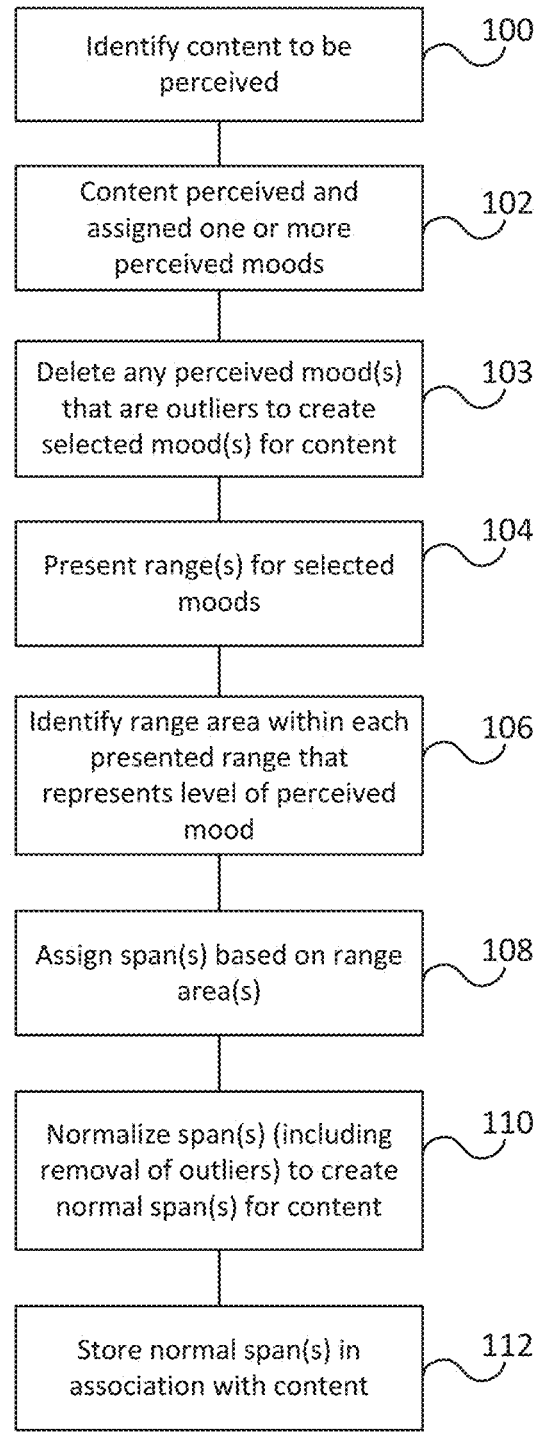
FIG. 1 illustrates a flow diagram of an embodiment for identifying one or more moods corresponding to content and for translating each mood into a span.

In the English language, the word "emotion" is used as a generic term for subjective, conscious experience that is characterized primarily by psychophysiological expressions, biological reactions, and mental states. A "mood" is considered to be an emotional state. Moods are considered to differ from emotions in that they are less specific, less intense, and less likely to be triggered by a particular stimulus or event. Moods generally have either a positive or negative valence. In other words, people typically speak of being in a good mood or a bad mood. "Feelings" are also considered to be the subjective, conscious experience of emotion. Collectively the words "emotion", "feeling" and "mood" are often used to describe the subjective, conscience perception of individuals to a variety of different factors, such as internal factors (i.e., mental, chemical, physical, etc.) and external factors that are internalized (i.e., touch, sight, taste, hearing, etc.).

When a human perceives content, such as objects, text, pictures, odors, sound, video, etc., that content often triggers an emotion, feeling, mood or other subjective, conscious experience. To simplify the description provided herein, such experiences or triggers will be referred to herein as "moods," but the description provided herein should not be limited to just the commonly understood meaning of the word "mood" and should therefore be understood to also include emotions, feelings and similar expressions of subjective, conscious experiences. As people often confuse moods with emotions, the description of moods used herein also includes emotions, feelings and related concepts.

A wide range of moods are known to exist, as represented by the English language, many of which are synonyms of one another. In addition, there tend to be words that represent a general mood, such as happy, and other words that represent different levels, depths or submoods of that particular general mood, such as bouncy, cheerful, ecstatic, giddy, jovial, etc. The following is one possible, but non-exhaustive, list of a number of different moods: Accepted, Accomplished, Aggravated, Alone, Amused, Angry, Annoyed, Anxious, Apathetic, Ashamed, Awake, Bewildered, Bitchy, Bittersweet, Blah, Blank, Blissful, Bored, Bouncy, Calm, Cheerful, Chipper, Cold, Complacent, Confused, Content, Cranky, Crappy, Crazy, Crushed, Curious, Cynical, Dark, Depressed, Determined, Devious, Dirty, Disappointed, Discontent, Ditzy, Dorky, Drained, Ecstatic, Energetic, Enraged, Enthralled, Envious, Exanimate, Excited, Flirty, Frustrated, Full, Giddy, Gloomy, Good, Grateful, Grumpy, Guilty, Happy, Hopeful, Impressed, Indescribable, Indifferent, Infuriated, Irate, Irritated, Jealous, Jovial, Jubilant, Lazy, Lethargic, Listless, Lonely, Loved, Mad, Melancholy, Mellow, Mischievous, Moody, Morose, Naughty, Nerdy, Not Specified, Numb, Okay, Optimistic, Peaceful, Pessimistic, Pissed off, Pleased, Predatory, Quixotic, Recumbent, Rejected, Rejuvenated, Relaxed, Relieved, Restless, Rushed, Sad, Satisfied, Shocked, Sick, Silly, Smart, Stressed, Surprised, Sympathetic, Thankful, Touched, Uncomfortable, and Weird. The above list is certainly not inclusive of all possible moods and some of the moods included in the above list may not be considered moods by some people, but the list at least provides a number of non-limiting examples.

Any form of content may trigger different moods within humans and the moods that someone may feel upon being subjected to certain content can vary from person to person, depending on their internal factors, gender and other circumstances. For example, the same content that may create a jovial mood in one person may create a lonely mood in another due to their particular circumstances. As any of these moods may be appropriate for the content, initially at least, the mood identified by each person needs to be stored in case the moods identified by each person are selected by a number of other persons. In addition, while one person may be able to select a particular mood and say that is exactly how that content makes them feel, other people may not be able to be so specific.

In an embodiment, as used herein, people perceiving certain content are called "users" when perceiving the content at the identification stage and are called "end users" when perceiving certain content at the selection stage. At the identification stage, users may be tasked with selecting any mood the users can think of that might correspond to that content. As such an embodiment might result in a wide range of moods that are difficult to correlate, in an embodiment the users may be restricted to a list of moods from which they may select. By having experienced users preview the content, it may be possible to generate a fairly short list for the users to use. In addition to presenting users with a list to simplify the identification process, in an embodiment, users may be presented with a range, scale or spectrum, referred to as a "range" herein, which represents or corresponds to an intensity level for each of the moods on the list. The range may be represented in a number of different ways to assist in the process of identifying corresponding moods for content, such as indicating a low to high range, a white to gray to black range, a light to dark color range other than white, gray or black, or some other representation of a spectrum, range or variance, such as 0 to 100, or A to Z, or * to ***** or any other type of appropriate range representation.

Ranges provide users with a simplistic way of identifying a mood and the intensity of the mood associated with content, but a range by itself may not provide sufficient specificity. For example, if a number of users perceiving certain content were given a mood range, such as a happy mood range, and tasked with picking a point on the happy range that corresponds to the content, some users could pick a point within that happy range, such as slightly happy and be satisfied with that, while other users might not be able to be so specific. Such users might need to pick a subrange or range area within the happy range that represents a range of intensities of that mood, such as somewhere between slightly happy to quite happy, but not very happy. Conversely, if the content made users feel very happy, the users might pick an area above the midpoint of the spectrum or range.

When a sufficiently large number of users perceive the same content, it is usually possible for most of them to agree that that content represents one or more moods, and within each of those moods, a fairly specific subrange of the corresponding range, which are referred to herein as "intensity normalized moods" or "normal moods." While a normal mood may not be specific and may be represented by a fairly large subrange, a normal mood is still capable of identification. Utilizing a sufficiently large number of users, however, may be cost prohibitive. Likewise, expecting each user to select subranges within each range for each mood may be time consuming and therefore cost prohibitive. To reduce normal mood identification costs, in an embodiment a small number of users are used and the users are only tasked with selecting the mood and a point within the mood that roughly corresponds to their perceived mood.

A span corresponding to the point may then be automatically assigned by a computer system, either before or after the point has been stored in a memory. The span may represent a subrange that corresponds to the point, with the size of the span being predetermined in some manner. For example if a range was identified by the numbers from 0 to 100 and the user picked the point 35, the span may be predetermined to be five or ten points on either side of the point, such as from 25 to 45 or 30 to 40 for the span. The word "span" is not limited to representing just a portion of a single range, but can quite literally span between two or more ranges. Hence, the word "span" as used herein represents a broader concept that just the word span. For example, a user may identify a point near the top of one mood range and another point near the bottom of another mood range for the content, thereby making it make sense to create a single span that covers a portion of the top of the first mood range and a portion of the bottom of the second mood range.

Once spans have been generated for a number of users for a piece of content, the generated spans may be averaged, normalized or otherwise combined in any of a number of ways, also while possibly removing any outliers, to generate the normal mood to be identified for the content.

The process described above for generating a normal mood for content relies upon human users to perceive the content, such as perceiving visually, aurally, orally or through other senses (smell, taste, touch, thought, etc.), which are referred to as "perceiving," "perception" or simply "perceive" herein, and determine the mood(s) that such content causes them to perceive. Computerized methods could be used in combination with the human analysis process described herein to supplement the human analysis or to supplement the computer analysis, or in place of that human analysis process. For example, humans could still be used to perceive the content, but rather than specifying their own moods, a computer monitoring their activities, facial expressions, vocal output and other factors could analyze the human and determine their moods while perceiving the content, to identify the mood(s) associated with the content.

A number of technologies exist that describe systems for analyzing different types of input from users, such as voice, eye tracking, hand pressure, etc., to determine their emotions or moods for different purposes, such as U.S. Pat. Nos. 6,151,571, 6,964,023 and 8,390,439. Additional technologies have been developed to determine moods associated with music, including music in videos, such as U.S. Pat. Nos. 7,115,808, 7,396,990 and 7,921,067. These technologies might only have limited utility in the context of the present disclosure since they offer a relatively incomplete solution, i.e., not all content includes music and/or the music included may not match the mood of the content with which it is associated. U.S. Pat. No. 7,233,684 and U.S. Published Patent Application Nos. 2008/0235284, 2008/0253695 and 2010/0086204 describe systems for using various devices to monitor a user's emotions, actions, etc., while the user is taking a picture or viewing content of some sort, and then tagging the content with metadata associated with the user's emotion. The tagged content can then be stored and searched for in the future, for example, to help a user find other photos that user has taken or viewed that were tagged with a similar emotion. Absent the development of significantly more sophisticated computer technologies, including artificial intelligence that can perceive something more than the very simple inputs and human expressions described in the above patent publications, such computer technologies are presently only capable of supplementing human analysis. And, even when such computer technologies get to the point of being able to sometimes reliably perceive moods associated with content, it will still be necessary to filter the moods, such as through the use of spans to more specifically define the perceived moods, to normalize the moods, and to extract outliers as described herein in order to make the normalized filtered data useful.

For certain types of content, the timing length of the content may also alter the perceived moods that may be associated with that content. Due to the human attention span issues noted above, it may be exceedingly difficult for a piece of content to maintain a single perceived mood that lasts for more than 3-5 minutes. Beyond that period of time, it may be necessary for the content producer to mix up the moods portrayed, along with other aspects of the visual (i.e., scene changes) and aural (i.e., sound changes) content in order to help a human refocus their attention. As a result, longer content may include many more moods than shorter content. Further, although the same mood may be presented over a longer piece of content, the mood of the human perceiving that content may change while they perceive it, going from one mood (e.g., mellow) to another mood (e.g., bored) over time.

Despite the above, moods have not been used to identify the perceptual nature of most content for a broader consumer audience in commercially productive ways. There may be a number of reasons for this, including video content generally being longer in length and involving multiple different moods, therefore not being conducive to being identified or labeled according to moods as there may be too many moods involved for practical identification. Further, it can be difficult to identify the moods represented in content after it has been created because existing computerized technology is not sufficiently accurate or sophisticated and using humans to develop normal moods generally requires enough people to perceive the content and then identify the moods they feel, which can be expensive and time consuming for existing portfolios of content.

As a result, most content is produced and identified according to completely different systems, such as object type or genre. Object type generally refers to aspects of an object, a type of car, a color of an object, a feature of an object, etc. Genre generally refers to categories of literature or other forms of entertainment, i.e., music, audio, visual. Genre was initially utilized to classify ancient Greek literature into just three categories: poetry, prose and performance. Over time, different genres developed in response to changes in audiences and content creators, allowing genre to become more of a dynamic system. While genre has been a useful system, since it adapts over time and often reflects the current zeitgeist, genre likewise suffers from the fact that the meaning of different categories shift over time and users often forget that genre categories are not static nor necessarily accurate. Moods, on the other hand, are more static. If content makes a user feel peaceful, that content will likely continue to make other users feel peaceful long into the future.

Genres applicable to visual and literary arts include drama, horror, romantic, comedy, musical, crime, science fiction, fantasy, educational, etc. The problem with these broad genre categories is that they may be mis-descriptive or overly limiting. For example, a user of a movie pay-per view system may want to watch a comedy, so they select the comedy genre and then page through hundreds of films that are considered by someone to be comedies. While a selected film may include scenes that are funny to many people, those scenes may not be funny to all people and those scenes or other scenes may also include scenes that are dramatic, horrific, romantic, sexually explicit, etc. In contrast, were it possible to identify the films based on the moods they tended to represent, the user might have a more accurate way of accessing, or an additional way of accessing (if mood selection augmented genre selection), how a particular film might make them feel. The same would be true in a bookstore or library, where books are categorized by genre and that is about it. Adding mood selection to the user's selection tool may significantly enhance the user's experience and ability to select one or more books the user will enjoy, given a particular mood.

While the present disclosure is directed to embodiments of creating and/or identifying normal moods for content, then organizing and making that content available in a variety of ways, including an end user selection system, generally called "distribution" herein, based on the normal moods represented by such content, the present disclosure is not limited to any particular type of content and includes any type of content that may trigger moods in humans. For example, certain types or styles of clothing may illicit moods in humans that could be used to help humans select clothing that allows them to feel a certain way, or to be perceived by others in a certain way. Many other types of content could likewise be identified by average moods.

A number of non-limiting examples of how moods may be used to identify other types of content, versus literary content and music content, are described below. While food is a type of content that lends itself to mood identification, food itself encompasses a very wide range of different content. One type of food content includes sweet treats, such as pie, cake, bars, ice cream, yogurt, sorbet, pudding, donuts, shakes, cookies, muffins, candy, quick bread, smoothies and many other types of similar foods. Taking pie as just one example of this type of content, pie may cause users to perceive, through eating or just thinking about pie, moods such as sentimental, awake, bittersweet, blissful, ashamed, content, devious, full, happy, lethargic, and pleased, to name a few.

As noted earlier, clothing may also cause users to perceive a wide range of moods that may depend on the type of clothing, such as clothing accessories, pants, shoes, coats, vests, dresses, shorts, capris, jackets, skirts, shirts, sweaters, suits, denim/jeans, and lingerie, to name a few. While a suit may cause users to perceive moods of relaxed, satisfied, smart, energetic, weird, nerdy, dorky, curious, determined, and accepted, certain types of lingerie, which may include a camisole, bustier, boy shorts, a bodysuit, a babydoll, a garter, a corset, a G-string/thong, a chemise, a body stocking, and a teddy, may cause a user to perceive other emotions. For example, a bustier may cause users to perceive the moods of flirty, shocked, silly, predatory, touched, weird, naughty, high, grateful, and devious.

Vehicles and other forms of transportation, such as cars, trucks, buses, motorcycles, bikes, ships, boats, aircraft, watercraft, trains, and variations of the above, might cause users to perceive a wide range of moods. The moods associated with ships, which may include amused, chipper, crazy, ecstatic, enthralled, mischievous, optimistic, peaceful, satisfied, and sleepy, could differ significantly from the moods associated with aircraft. Pets may also be associated with different moods depending on the pet, which may include dogs, cats, birds, reptiles, fish, arachnids, rodents, rabbits, frogs, crabs, horses, sheep, goats, and poultry to name a few. Poultry, for example, may cause users to perceive moods of blissful, bouncy, cheerful, sympathetic, apathetic, giddy, hungry, indifferent, loved, and thankful, while who knows what users may perceive from crabs.

Having described content and moods above, embodiments for identifying perceived mood(s) in content will now be described with reference to the figures. FIG. 1 illustrates a flow diagram of an embodiment of a computer system for identifying one or more perceived moods corresponding to content for subsequent processing, selection and distribution. As noted, the content could be any type of content, including digital or analog content, such as video, music, pictures, photos, and sounds, or different types of service content, such as dry cleaning, massage, medical, spa, salons, dog grooming, car washes, floor refinishing, handyman, repair, delivery, etc., or different types of goods or products, such as homes, cars, clothing, consumer electronics and other consumer goods, etc. Any of these very different types of content may cause users to perceive an emotion or mood-like response from perceiving (including just thinking) of the content. As noted above, pie may make users perceive a sentimental mood because when they have or even think of pie, they may associate pie with some positive aspect of their childhood, or for other reasons. The content may also be pre-existing, specially created, or of a specified length for the purpose of causing users to perceive one or more moods, as further described below.

In step 100 of FIG. 1, the content to be perceived is identified in some manner. If the content is of the type that can be stored in non-transitory memory of the computer system and then perceived by one or more individuals, such as by playing music or video, operating software, reading text, etc., then that may constitute one manner of identifying the content for perception. If the content is a different type of object, perception may take many other forms, such as capturing the object on some form of digital media and being perceived in that manner, or being perceived in the physical world, such as by seeing the actual object, touch, taste, sound, and other types of senses, like driving a car, eating food, wearing clothing, etc. Any of these forms of identifying the content to the user (and/or a computer) would constitute identifying the content for perception purposes. To clarify, when a computer is being utilized in substantially the same manner as a human perceiving content, the computer is included in the definition of "user" as utilized herein.

The manner in which the content is to be perceived may also change the moods that may be used to identify the content for subsequent use. For example, if the content is to be viewed by users either at the identification stage or at the selection stage, then the moods that may be used to identify the content may be different than the moods that may be identified for the content if the content is physically perceived. Hence, before moods may be identified for the content for subsequent processing, if any, it may be desirable to know the manner in which the content is to be perceived so the moods that could possibly be identified for the content are limited or restricted appropriately. For example, if there were 100 possible mood categories, 10 of those moods might be identified for the content if the content is to perceived in one manner and 5 of those 10, plus 5 other moods not among the 10 might be identified for the content if the content is perceived in a second manner.

One purpose of identifying moods based on the manner of perception, as well as using filtering, such as ranges and spans, is to improve the accuracy of identified moods so that end users end up with content selections that match the moods they wanted to find. For example, if a user is attempting to select a song, a movie, a paint color, a type of ice cream, or any other type of content among a large number of possible selections, i.e., tens of thousands of songs, thousands of movies, hundreds of paint colors, or 31 flavors of ice cream, the content generated by the selection system in the end needs to come close to matching their mood in an accurate manner or the end user will feel as though the system does not work and will no longer want to use it.

In contrast, with other types of content, there may be greater flexibility that may enable the provider of the content to manipulate the selection system to their advantage. For example, any particular car or automobile manufacturer may only have a limited number of cars that they may offer so there may only be a limited number of moods that could possibly be identified for the cars, and in turn be used by end users to select cars. In addition, the manufacturer or dealer may want to filter the possible moods or ranges of moods to be available, such as limiting the moods to more positive moods so end users are not using negative terms to look for their cars. Hence, the possible moods to be identified for the cars may be filtered so as to come from a small group of all possible moods so that end users are restricted to a small number of choices within the selection system. As used herein, moods that have been filtered to artificially limit the moods in some way are referred to as "manipulated moods." Manipulated moods may be created and used in other ways or for other purposes. For example, if the manufacturer or dealer wants to move, i.e., sell/lease, certain cars that might not otherwise move, or to move them at a faster rate than other cars, such as older year models, overstocked models, certain colors, etc., the manufacture or dealer can filter the moods to specifically identify just the cars that need to be moved. By identifying these groups of cars to be moved with certain manipulated moods that are not used for other cars, and then limiting end users to a selection of moods that include these manipulated moods, end users may be driven to looking at certain cars that they may not otherwise be willing to consider because they think the car meets the mood for which they were interested in searching.

Identification of the content to be perceived in step 100 may include other modes of identification. For example, users may be employed or volunteered to perceive content, such as viewing video content, and identify one or more moods to the content based on how the content makes them feel. The content may be made available to the one or more users in a variety of manners, such as through a graphical user interface of a website, for such an identification, even though those individuals do not necessarily know they are being tasked with identifying moods for the content. For example, such individuals could be encouraged to visit a website for some purpose not related to identifying moods for content, but nevertheless be encouraged to perceive content and identify moods for that content before they can get something else they want or do something else associated with the website.

For example, users could be encouraged to watch videos of a car, read information about the car, listen to someone talk about the car, or other forms of information at a website and then be asked to enter their perceived moods in association with the car, or some other aspect of the car, such as different options for the car. Alternatively, users at a car show could be encouraged to walk around and check out the car, sit in the car, perhaps even test drive the car and then enter their perceived moods in association with the car as described herein. Other methods of identifying content to users may include crowdsourcing, where anonymous users are assigned the task of perceiving content and identifying moods and range areas, as further described below, for free or for some small payment in cash or something else of value that could be transmitted electronically. Since some individuals may not take such a task seriously, as earlier noted, outlier moods (moods identified by users that lie far outside of the norm determined by the majority of users of that same content) identified for the content may be deleted from the stored mood identifications for such content. The above-described means of identifying content to users and encouraging users to perceive the content are just non-limiting examples of identifying content for perception purposes and many other methods may be used within the spirit and scope of this disclosure.

Once the content has been identified for perception, the content may be perceived and identified as including one or more perceived moods, as noted in step 102. As previously noted, users may be allowed to select from a wide range of moods or restricted to a particular list. An automobile manufacturer, for example, may not want negative moods to be available for perception purposes and may therefore restrict users to a list of moods that include primarily positive moods. In contrast, as video content may purposely seek to cause users to perceive both positive and negative moods, there may be no similar restriction, but a list of moods could nevertheless be created to cause the users to focus in particular areas. In such instances, more experienced users may first perceive the content and select a number of moods they think might be appropriate, or a computer compute be used for this pre-screening purpose, and the list of moods may be based on the prescreened listing.

As also previously noted, some users may perceive content, such as a video, and decide that the content makes them feel happy, while other users may view the same content and decide that it makes them feel not happy, i.e., sad or angry. With some content, it may be possible to anticipate that such content may make some users perceive the opposite of other users. As a result, it may be appropriate to automatically identify an opposite mood for such content once a mood has been identified for the content by a user. Hence, any content identified with a happy mood may also automatically be identified with a sad mood as well, or automatically identified by any of a number of moods that are related to either of these moods. For example, if content was automatically identified by the mood sad, that same content may also be identified by related moods of dejected, depressed, melancholy, sorrowful, dismal, blue, down, gloomy, glum, forlorn, and low.

Statistical and algorithmic analysis may also be used to identify or supplementally identify moods based on a variety of different methods. For example, given a sufficiently large sample of a particular type of content that have been identified with certain moods over time, certain statistical trends may be found to apply to such content. For example, every time users identified mood 1 and mood 2 for a type of content, 90% of the time they also identify mood 8 and mood 15 for that same content. If after some period of time, users searching for content always decided that particular content meets their mood criteria for mood 1 and/or mood 2, but the content was not also identified by mood 8 and mood 15, the content could further be identified by moods 8 and 15 (through application of an algorithm programmed for such a purpose) because of the high statistical possibility that moods 8 and 15 also apply to the content.

Regardless of the type of user perceiving the content, some users may be likely to perceive the content and identify a mood that few other users perceive, so in step 103, outliers are removed to create one or more selected moods for the content that is then made available for further filtering. As described herein, filtering involves the use or ranges and spans, but other forms of filtering may be used. One purpose for filtering the identified moods is to further refine the identified moods so the normal moods will more accurately reflect the mood of the content. Hence, a normal mood may also be generated by filtering identified moods in a variety of ways to improve the accuracy of the moods identified for the content, such as refining the selected mood to identify one or more submoods within the selected mood as the normal mood(s).

A filtering embodiment is further disclosed in steps 104 to 108 that involves ranges and spans. In step 104, ranges may be presented for each of the selected moods. The presentation may be to a computer or human, in each case a user, through a variety of presentation means. In one embodiment, in step 106, the presentation means is a user interface, associated with a computer system, that includes some type of gauge or measuring device that represents an analog spectrum or range of choices representing different degrees of that mood, as further described below with respect to FIGS. 2 to 5. The user may then select a point or area within that range (referred to herein as a "range area" even if the range area is represented by a single point within the range) that represents, to the user, a level or degree associated with that selected mood that more accurately represents how the user feels about the content. It should be noted that the users performing filtering in steps 104 and 106 may be, but need not be, the same users that identified perceived moods for the content in step 102.

As previously noted, the range may indicate a low to high range, a white to gray to black range, a light to dark color range other than white, gray or black, or some other representation of a spectrum or range, such as 0 to 100, or A to Z, or * to ***** or any other type of representation. If content made a user feel happy, but only slightly happy, then that user might select a range area below a midpoint of the range presented. Conversely, if the content made the user feel very happy, the user might pick an area above the midpoint of the range.

If multiple moods have been identified for content, the user would pick a range area for each range presented. Once selected the range area may be stored in memory for further processing or processed in real time in step 108 to assign spans to the range areas. As previously noted, once the range areas have been selected the computer system may automatically assign a span corresponding to the range area, as further illustrated in FIGS. 2A and 2B. The span may also be stored in the memory once assigned.

Once the spans have been assigned in step 108, it may be necessary to further filter the selected mood data to normalize the data and to remove any outliers, as set forth in step 110. Although outliers were removed in step 103, range area selection and span assignment may serve to illustrate other anomalies that may impair the value of the resulting data. For example, if most of the users selected range areas above a mid-point of a range, but a few users selected range areas below the mid-point, the few range areas below the mid-point may be thrown out as outliers so as to not skew the results obtained from most users. Once any outliers have been thrown out, the resulting spans may be normalized to derive a single normal span for the content. This normal span may then be stored in some way in association with the content, step 112. Such association may vary depending on the nature of the content. With digital content, the normal span may be stored as metadata directly associated with the content, but with other types of content, such as physical objects or nonphysical or digital services, the normal span may be stored in a file that is otherwise associated with the content and can be accessed from the file when needed for other purposes, such as the searching functions described below.

Before further describing filtering as implemented with ranges and spans in greater detail, another filtering embodiment of the identification stage will be described. All content can be identified by certain categories, such as movies, books, furniture, food, automobiles, shoes, etc., and within each of those categories, a number of different subcategories. For movies and books, the subcategories may be identified by various genres, such as comedy and horror, as well as other subcategories, such as nudity, excessive blood, mature themes, etc. For furniture, the subcategories may include chairs, couches, tables, end tables, etc. For food, the subcategories may include fruits, vegetables, packaged goods, deli items, etc. For automobiles, the subcategories may include sport, family, cross-over, sport utility, etc. For shoes, the subcategories may include flats, sneakers, stilettos, etc. In the embodiment, the user may identify one or more subcategories and then identify one or more moods that are associated with each of the one or more subcategories.

In this manner, at the selection stage, end users may be able to select subcategories in a positive or negative manner as well as selecting moods associated with the positive subcategories. In other words, a subcategory may be identified as something that the end user wants or does not want, or both something the end user wants and a different thing the user does not want. In an embodiment, an end user may identify a positive subcategory, one or more moods associated with the subcategory, and a negative subcategory. For example, with respect to movies, the user may identify comedy as a positive subcategory, the mood of silly, and nudity as a negative subcategory. As a result, the selection system will generate a list of movies that are silly comedies that do not include nudity. Hence, in this example, the filter for refining the moods is the positive and/or negative subcategories associated with the moods.

While moods are still important when using positive and/or negative subcategories, the exact moods may not be as critical to a good result for the end users. Hence, instead of filtering the perceived moods to the degree of creating normal spans, it may be possible to just use the more generalized perceived moods, because the positive and negative subcategories provide a certain degree of filtering that narrows the possible outputs of the selection system. For example, if an end user specifies as a positive subcategory that the end user is interested in couches, certain assumptions can be made at the identification stage as to the moods that might apply to couches, especially couches of a certain type. Sectional couches that are more ideal for larger houses and families are less likely to be associated with moods that might be used by a single person, while love seats are less likely to be associated with moods that might be used by families. Thus, at the identification stage, certain subcategories could have a filtered range of moods associated with them such that when an end user selects one of these subcategories as a positive subcategory, the end user is automatically given those filtered moods and if the user selects a negative subcategory, the end user is automatically not give filtered moods associated with the negative subcategory.

In the same regard, the perceived moods used during the identification stage and the moods provided by end users during the selection stage, when using subcategories or manipulated moods, can be filtered so as to be broader in context versus more specific. Filtering with ranges and spans is one embodiment for providing a more accurate result when the content being identified and selected comes from a large pool of similar content. When the pool of content is smaller, it may not be necessary to define one or more submoods within a mood range because the mood range by itself is sufficient to narrow the output of the selection system. Returning to the couch example above, it may not matter that a couch makes an end user feel slightly sophisticated or very sophisticated, as long as the user feels sophisticated at all.

Figure 2A:
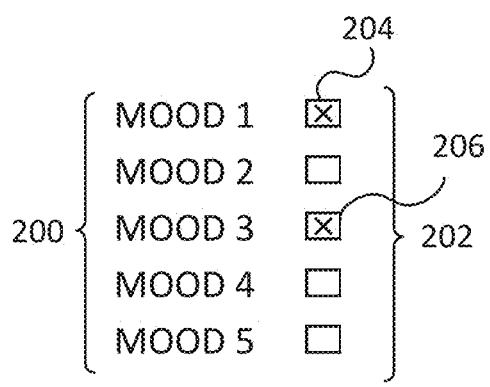
FIG. 2A illustrates an embodiment of a user interface for identifying moods associated with content.

Returning now to filters involving ranges and spans, FIG. 2A illustrates the first part of an embodiment of a user interface of the computer system for enabling a user to select moods and range areas for content. In order to pre-limit user selection and to prevent outliers, content may be pre-identified by a set of moods that a pre-screener has determined are appropriate for that content. The set of moods could be large or small, depending on how much discretion was desired from the users. Alternatively, the content may not be prescreened or otherwise limited and all possible moods could be made available for identification for the content by the user. The moods could be presented in a list or a set of tiles of images or in some other way that allows a user to scan through the moods and select one or more deemed appropriate for that content. While it is recognized that as a result of not pre-limiting the possible moods that a user could identify for content creates the potential for outliers, it may also enable users to identify moods for content that may not have been among those identified by a pre-screener. Hence, not pre-limiting may allow users to more accurately reflect how content actually makes them feel, while at the same time, not pre-limiting may result in more outliers or unpredictable outcomes, depending on the quality of the users properly identifying moods for content.

As illustrated in FIG. 2A, the content has been pre-screened and identified by a certain number of moods 200, identified as Mood 1, Mood 2, Mood 3, Mood 4 and Mood 5. The number assigned to a mood may vary between one mood and an unlimited number of moods. As shown in FIG. 2A, only a total of five moods have been identified for particular content pursuant to the process noted above, but any other number of moods could have been pre-identified, or no pre-identification could have been done. The user interface of the computer system could also include some system by which the user can then select the moods, such as by selecting a box (such as a radio box that could be selected by a mouse click within the area inside the box). Five radio boxes 202 associated with the five pre-identified moods are shown in FIG. 2A. If the viewer decided that Mood 1 and Mood 3 best described how the content being perceived made them feel, the user would then selected box 204 and 206, associated with Mood 1 and Mood 3 respectively.

Figure 2B:
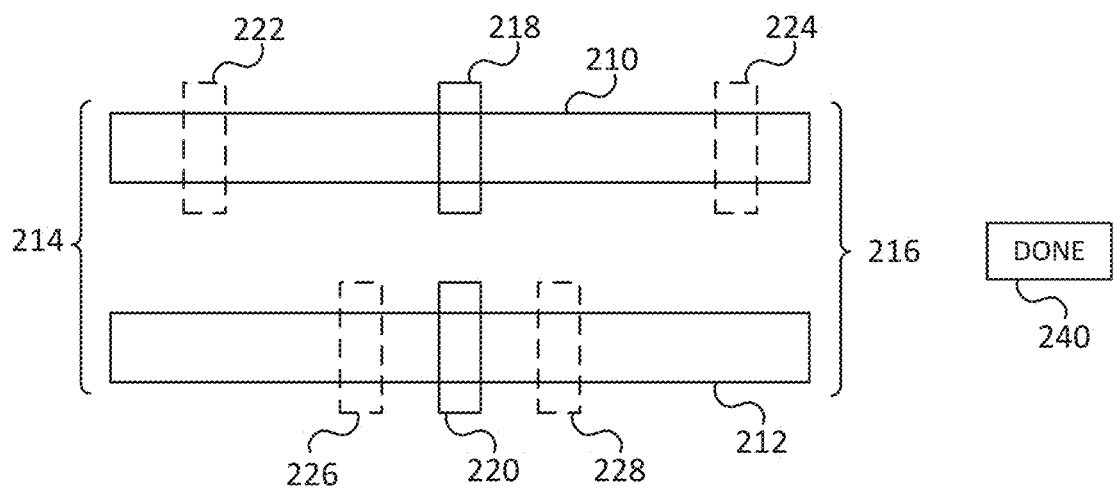
FIG. 2B illustrates an embodiment of a user interface for identifying range areas to moods identified in FIG. 2A.

As described above, after selecting a mood, the user may then be presented through the user interface with a range corresponding to the mood. As illustrated in FIG. 2B, the range 210 corresponds to Mood 1 and range 212 corresponds to Mood 3. Ranges 210 and 212 are simple devices that serve to illustrate an embodiment for identifying a span for the selected areas, but as noted below, many other devices may be used within the spirit of this disclosure. In FIG. 2B, ranges 210 and 212 are simple bars with the low end 214 of the range corresponding to the left end of each bar and the high end 216 of the range corresponding to the right end of each bar. Each range 210 and 212 has a midpoint, such as illustrated the cross bars 218 and 220. To select a range area for Mood 1, the user may select the cross bar 218 with the mouse (finger or some other selection device) and drag it to the right or left, or not grab it at all and simply leave it where it was in the middle of the range.

If the user selects the cross bar 218 and drags it to the left toward the low end 214 of range 210, the range area may then be represented by the dotted line 222, which might correspond to a "low" range area for the user. Conversely, the user may select the cross bar 218 and drag it to the right toward the high end 216 of range 210. The range area may then be represented by the dotted line 224, which might correspond to a "high" range area for the user. Likewise, for Mood 3, the user may select the cross bar 220 of range 212 and move it to either range area 226 or 228, representing a "medium low" range area or a "medium high" range, respectively. Once the user has made the range area selections, the user may indicate that the user was done through any of a number of different ways, such as simply selecting the "DONE" button 240.

Figure 2C:
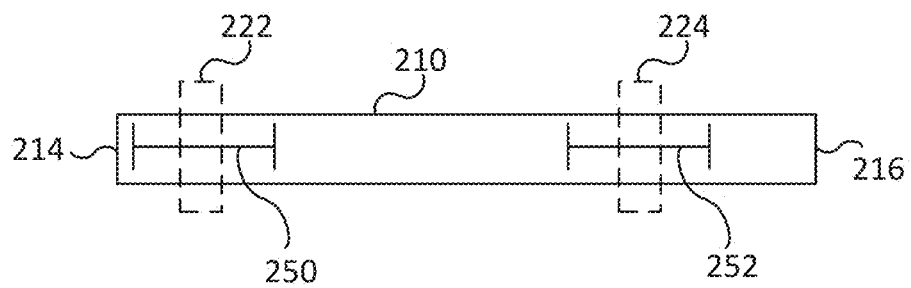
FIG. 2C illustrates an embodiment of a user interface for assigning spans to mood range areas.
Figure 3:
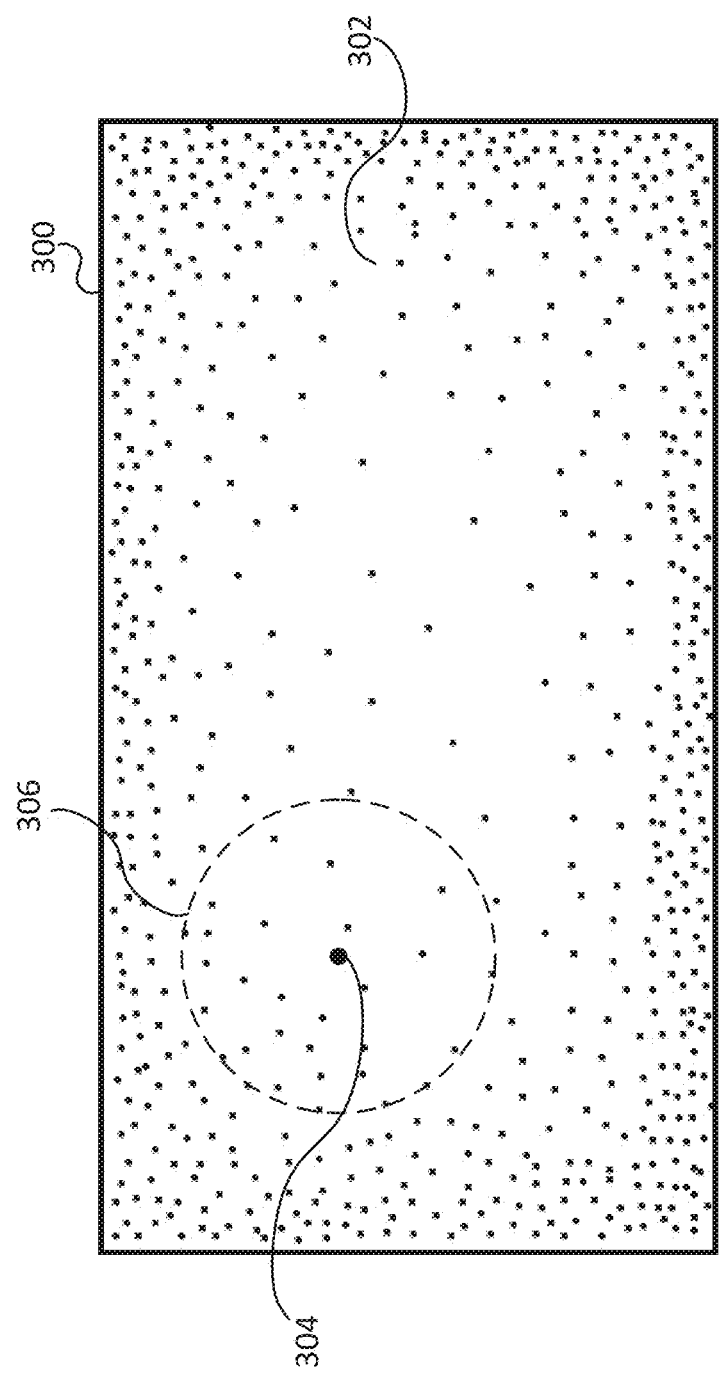
FIG. 3 illustrates an embodiment of a user interface for a mood identification tool and/or a span selection tool.

Once the user was done with range area selection for each range corresponding to each mood, the computer system may then automatically assign a span to each range area, as further illustrated in FIG. 2C. The range 210 is shown in FIG. 2C in greater detail after spans have been assigned to the range areas. For example, span 250 has been assigned to range area 222 and span 252 has been assigned to range area 224. In the case of span 250, the span approximately covers an equal area on either side of the range area 222 and the span goes all of the way to the low end 214. Had the range area 222 been closer to low end 214, the span 250 might not cover an equal area on both sides of the range area 222, but instead cover the same area as shown in FIG. 2C to the right of the range area 222, but cover less area to the left of the range area 222 due to the close proximity of the low end 214. In an embodiment, if the span was limited by the low end or high end of a range, then the span could be more heavily weighted in the opposite direction. As range area 224 is not as close to the high end 216 as range area 222 is close to the low end 214, the high end 216 does not come into play. Nevertheless, there is no reason the span 252 must be equally weighted on either side of the range area 224 and any type of span could be selected. Since each user, as noted above, can feel different moods when perceiving the same content, the spans are intended to give the mood identifications greater flexibility than they would have if the mood was just identified by a work or a range area or point within a range. Hence, each mood is represented by a span within one or more ranges corresponding to the mood.

While the simple bars 210 and 212 are easy to understand as ways of expressing ranges and spans within a user interface, the present disclosure is not limited to such a simple user interface device. For example, other forms of ranges and spans could be used, such as that illustrated in FIG. 3, which shows a rectangular box or area 300 filled with dots 302 creating different areas of dot densities throughout the area 300. Dot density levels are greatest around the edges of the area 300 and lowest inside the middle section of the area 300. While the left side of the area 300 may represent low and the right side of area 300 may represent high, other assignments of low or high may be used, such as the top or bottom of the area 300. Different dot densities may also be used. To select a range area for the mood corresponding to content being identified by a mood, the user may simply pick an area within the area 300, such as range area 304. Range area 304 may be a small dot, a large dot or something else. For example, when the user moved a cursor or similar selection device over the area 300, a small box or other image may be generated over the area 300 corresponding to the location of the cursor over the area 300. Making a selection while over the area 300, may then lock the small box in the selected place, thereby representing the range area 304 selected by the user.

The span corresponding to the range area 304 may be determined in a number of different ways, such as a circle 306 centered around the range area 304, but may also be represented by other shapes, such as a square, rectangle, oval, etc. Hence, a range and a span within a range need not be linear (i.e., can be nonlinear) and may be represented by a number of different shapes. Regardless of the manner in which the span is identified and represented, each span represents some identifiable portion of one or more ranges and can be represented as such by a digital set or range of values. Hence, each analog representation of a range may be digitized in some way and the corresponding digital values can be stored in memory for use during searches. For example, the span 306 may be represented by a number assigned to the mood and additional numbers that correspond to the location of the span 306 within the area 300, which may be represented by a matrix of some form, i.e., A-G across the top and 3-7 along the side, which corresponds to A3, B3, C3, D3, E3, F3, G3, A4, B4 . . . G7, or something similar.

For as many range, range area and span representations as there may be for identifying moods for content, there may be a similar number of ways in which to represent ranges, range areas within those ranges and spans corresponding to those range areas. Rather than attempt to list every one of those possible representations, the manner in which users search for and select content will now be disclosed, but it is notable that for every selection method possible, the same method of selection may be used for mood range identification. For example, the range 210 may also be used to select a portion of a mood for a range to be searched for in the same manner in which moods were assigned spans in the first place, or in a different manner, which will be explained below in further detail.

A user wishing to search for and select content for some reason based on the moods of the content might simply select a mood that the user wished for the content to convey. That mood may be identified by a word entered by the user in a typical search bar and the search may be performed on that basis. The search engine of the computer system may take the entered word and search the database of moods for content in the memory of the computer system for content with similar moods, but this would not be much different from searching for key words in other ways, and may not correctly identify the right content corresponding to the identified moods of the search.

Accordingly, in one embodiment, a selection system may present an end user with one or more subcategories for a category of content from which to choose either a positive, a negative, or both a positive and a negative subcategory and also present the end user with one or more moods from which to choose. As noted above, an end user could pick comedies as a positive subcategory for the movie category, nudity as a negative subcategory and silly as a mood, and the selection system would list a number of silly comedies that include no nudity. Similarly, the end user could pick desserts as a positive subcategory from the food category, fulfilled as the mood, and pastries as the negative subcategory, and the selection system would list a number of desserts that may make users feel fulfilled, but are not pastries, such as pie, cake, pudding, etc.

In another embodiment, the end user may be presented (such as through a user interface) with a list of moods the end user was interested in seeing represented by content in the database, and then likewise presented with a search range corresponding to each selected mood. The end user would then select a search span within the search range or ranges in a manner similar to those described above. Range areas may also be used in a similar manner to identity search spans, but it may also be possible to skip the use of range areas for searching and to just have the end user select the span directly from within each range. For example, an end user presented with range 210, may simply select the entire range 210 to search, or may select the lower half of the range 210 to search. As will be illustrated below, the utilization of spans may allow end users to select portions of two or more ranges at a time, significantly expanding the scope and complexity of a search.

FIGS. 4A, 4B, 4C, 4D and 4E illustrate other embodiments of user interfaces enabling end users to select range areas and/or spans within ranges for both mood identification and mood selection, although just mood selection will be described herein. In FIG. 4A, the end user may be presented with dial 400, which may be shaped like a circle with numerous words 402 corresponding to moods extending from the circle likes the rays from the sun. Within the circle 400 is a color wheel or colored area with different colors or different shades, hues, intensities or other variances of a color that may correspond to each mood 402, with each color or variance bleeding into the next in the same manner as the colors of the rainbow appear to bleed from one color to the next as the light spectrum changes. A dial 404 may then be user selectable so that an end user may select the dial 404 and move it around the circle 400. If an end user moved the dial 404 so that the dial was aligned with a particular mood 402, and made that mood 402 the end user's search selection, the span may then be selected as a corresponding portion of the color wheel, which may then be digitized in some manner.

A variety of different techniques are known in the art for digitizing images, colors, ranges and the like and need not be disclosed here for a full understanding of this disclosure. Typically, the same digitization process or format used to digitize assignment spans may be used for searches, but since it is possible that content may be digitized using one format and searches may be performed using a different format, some conversion between the different formats may be required.

It should also be noted that moods and corresponding spans assigned to content in one manner may be searched by an end user based on the same type of span or completely different types of spans, but there may need to be some overlap in the digital content between the assigned span and the search span for content to be identified as a result of a search. This concept may be more simply explained with reference back to the range of FIG. 2C. If the range 210 corresponded to the numbers 1-100 and span 252 corresponded to numbers 65-85 of that range for a mood of content, and an end user performing a search using the same type of range selected the right half of the range 210 to search, then the content identified by the mood range 65-85 would be produced as a result of the search. If, however, the end user performing the search had identified the left half of the range 210, then the content identified by the mood range 65-85 would not be produced as a result of the search, even though that content at least corresponds to the same mood for which the end user is searching. Unlike existing types of search engines, the present embodiment may not attempt to identify all possible content that might correspond to the search request in some way, but rather only identify the best results, although different embodiments may have different goals. Since the content in question was assigned a high end of a mood by the span and the end user was interested in the low end of that mood, the video was not the best result, even though the assigned mood(s) matched the searched mood(s).

Other ways of representing ranges, range areas and spans that may be used for mood identification and mood search are illustrated in FIGS. 4B to 4E. In FIG. 4B, a range 420 similar to that of ranges 210 and 212 is illustrated, with the range being vertical rather than horizontal. Range 420 has a similar range area selector and span(s) assigned in a manner similar to that of ranges 210 and 212. Alternatively, as illustrated in FIG. 4B, for search purposes, there may be no range selection and only a span selection tool, such as tool 422, which allows the end user to move the span selection tool up and down the range 420 to identify different spans within the range. In an embodiment, as shown in FIG. 4C, the wheel 430 and dial 432 could be used to represent ranges by moving the dial 432 to a first position 434 to mark the first part of a span and then moving the dial 432 to a second position 436 to mark the second part of a span, with the digitized range of the span being identified as some range of numbers or other identifiers between mark 434 and mark 436. Similarly, in FIG. 4D, a color wheel 440 may be used with a movable large circle 442 within the color wheel 440 being the span selection tool. A honeycomb pattern 450 illustrated in FIG. 4E may be used in a manner similar to the color wheel 440, but with the variances between honeycomb cells 452 being used to denote a finer or more varied subset of digitized ranges as well as cross overs between moods, as further described below.

As noted in reference to FIG. 2C, it is possible, under some circumstances for a span to only partly cover a range for a mood. It is also possible for moods to overlap ranges. For example, when colors or other gradations, such as the edges of the honeycomb cells 452 are used to represent moods, related moods may be placed next to one another on the color wheel, or honeycomb cell pattern, or in some other manner, such that a span crosses over from one mood to another mood, i.e., a little bit "happy" and a little bit "agitated", or some other combination. In the same manner, when an end user is searching for content and selects a span that crosses over two or more ranges, then two or more moods may be identified, resulting in a number of different corresponding content pieces, i.e., content being identified as a result for the search.

Figure 5:
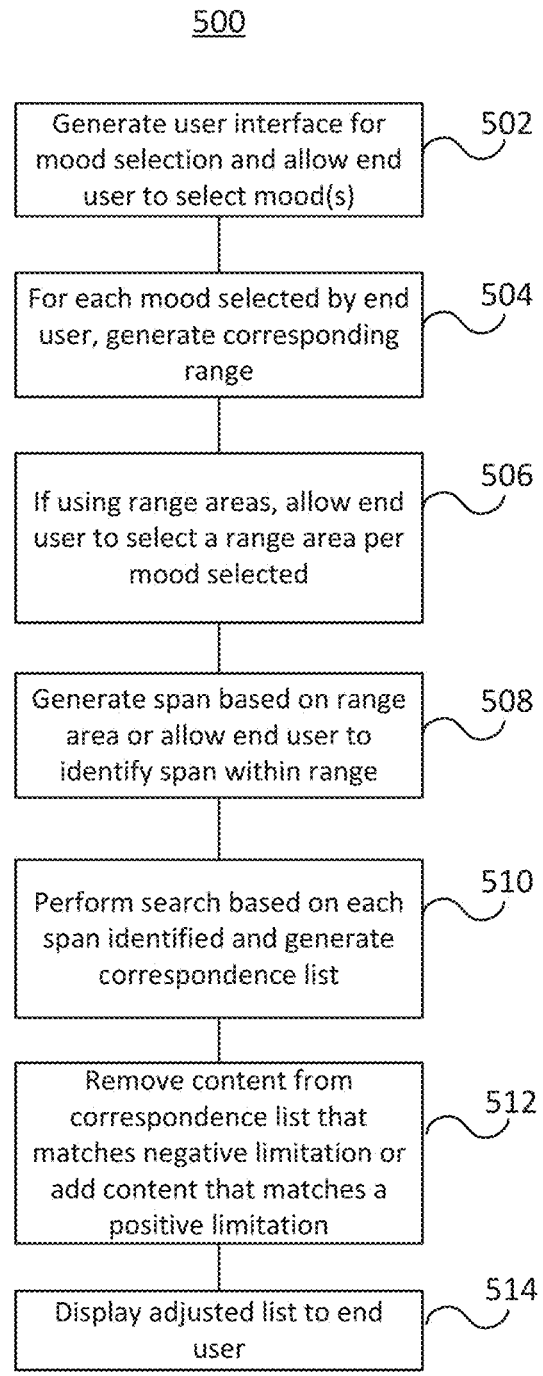
FIG. 5 is a flow diagram of an embodiment for selecting moods, range areas and/or spans for a search and performing a search.

FIG. 5 further illustrates this last concept in the form of a flow diagram, as well as the process for allowing an end user to select moods, identify spans and perform searches for content. In step 502, a user interface is generated by the computer system that may present the end user with a selection of moods and may allow the end user to select one or more moods to which content may relate. For each mood selected by the end user, in step 504, the user interface may then generate a corresponding range from which the end user, in step 506, may select a range area, if range areas are being used, in which case a corresponding span will automatically be created, or select a span and bypass selecting a range area, step 508. Alternatively, ranges and spans may not be used and the end user may be presented with positive and negative subcategories from which to choose along with one or more moods.

Returning to the example of more complicated span selection tools such as tools 400, 440 and 450, an end user may select a range of colors or gradations of a single color, or a number of cells within the honeycomb or some similar tool, or even partial cells, i.e., an end user may be able to draw a shape around a number of cells or colors or gradations within the interface display of a tool and have a search performed for any content that falls within all or part of the area bounded by the shape, in a manner similar to how the span 306 of area 300 covers a range of different dot densities. All of the range or ranges identified by the span or spans may then be converted into corresponding digital value ranges as discussed above and the search may be performed by matching digital value ranges from the identifications with digital value ranges from the search criteria. If the digital value ranges assigned to certain content fell completely within a searched digital value range, there would be a 100% correlation between the content and the search, resulting in that certain content being highly ranked as a result of the search. In other words, the level of correspondence between the moods assigned to the content and the moods being searched would be 100%. If the digital value ranges assigned to the certain content only fell partly within a searched digital value range, then the content would only have a partial percentage correlation, such as 20%, 40% or 75%, and would then be ranked accordingly in the results. The end user instituting the search may then be returned content based on the rankings generated from the percentage correspondence between assigned digital value ranges and searched digital value ranges, as in step 510 of FIG. 5.

Alternatively, the correspondence list generated in step 510 may first be further filtered by applying negative limitations selected by the end user, as in step 512. A negative limitation may be similar to the negative subcategories discussed above, such as by excluding nudity in movies or video, pastries for dessert, or recliners for chairs. Negative limitations may also include any other identifier that might be associated with content, such as colors for cars, actors for movies, bands for music, hues for paint, etc. Once the correspondence list has been adjusted by any negative limitations, the adjusted list, step 514, may be presented to the end user.

Positive limitations/subcategories may also be used in a manner similar to negative ones, as illustrated in FIG. 5, but may require different treatment. For example, a positive limitation may be used to identify a group of content in advance, thereby eliminating other groups of content from being part of the mood selection process at all. Alternatively, positive limitations/subcategories may also be used to cause content having a mood with a lower correspondence to be moved further up the correspondence list. For example, ten items of content may be identified that have a higher correspondence to the desired mood(s) than an eleventh item of content, but if the eleventh item was the only item that specifically matched a positive limitation selected by an end user, then the eleventh item may be moved to the top of the correspondence list, or at least moved further up the list.

As can be appreciated from the above description, even slight changes in a user search span selection within a span selection tool can result in significant changes in the searched value ranges and therefore generate different results. In the same manner, starting with a slightly different mood may also result in fairly significant search results, which can be advantageous depending on the application of the mood identification and search system.

While a number of different interfaces for mood identification and selection have been discussed, particularly with regard to range and span identification/selection, such interfaces are not the only relevant interfaces described herein. For example, the type of interface may vary based on the type of content or the environment in which the goods or services associated with the content is offered to end users. Some non-limiting examples of different types of content were listed above, such as art (written, pictorial or auditory), food, clothing, vehicles, etc., and for each of these different types of content, mood selection may need to be provided to the user in different manners and through different interfaces.

Figure 6:
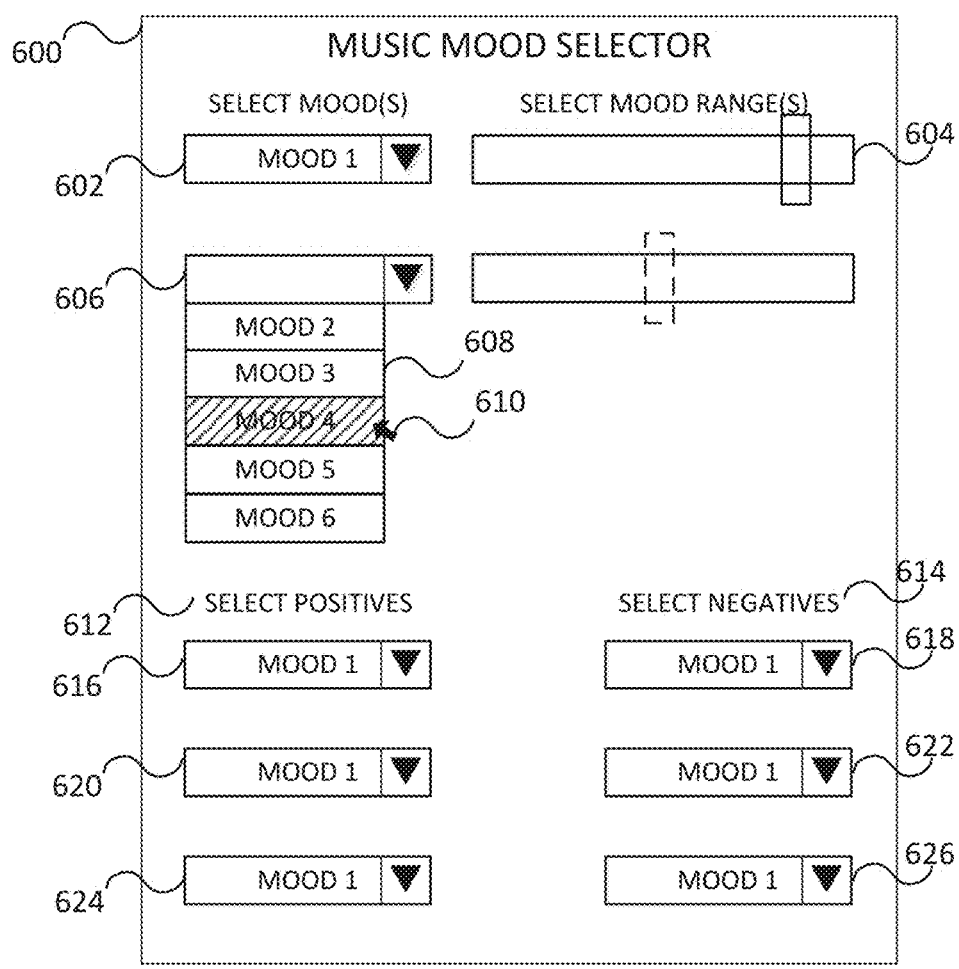
FIG. 6 illustrates an embodiment of a mood-based music selector.

With regard to digital arts, any type of software driven, computer-based interface associated with the delivery mechanism may be appropriate. For example, on a mobile device or personal computer used to watch movies, read books, listen to music, etc., the selection system and delivery system may be as illustrated above, i.e., the user is presented with one or more mood ranges of some form and given the opportunity to selects spans for each mood range presented along with other possible choices. FIG. 6 illustrates one example in which an end user is presented with an interface screen 600 for selecting music that invites an end user to select one or more moods and other criteria. As illustrated in FIG. 6, the end user has already selected one mood 602 and has been presented with the range 604 for mood 602, and is in the process of selecting another mood 606, which is highlighted as a result of having just been selected, from the drop down menu 608 using the cursor 610. Once the end user has selected the desired moods to be represented by the content, the end user may also have the option of selecting positive 612 and negative 614 subcategories, such as positive/negatives lists of genre from drop down menus 616 and 618, positive and negative artists from drop down menus 620 and 622, and positive and negative eras from drop down menus 624 and 626. After making all of these selections, the end user may then be presented with a ranked listing of downloadable music that best fits the desired mood(s) and positive and negative subcategories.

Figure 7:
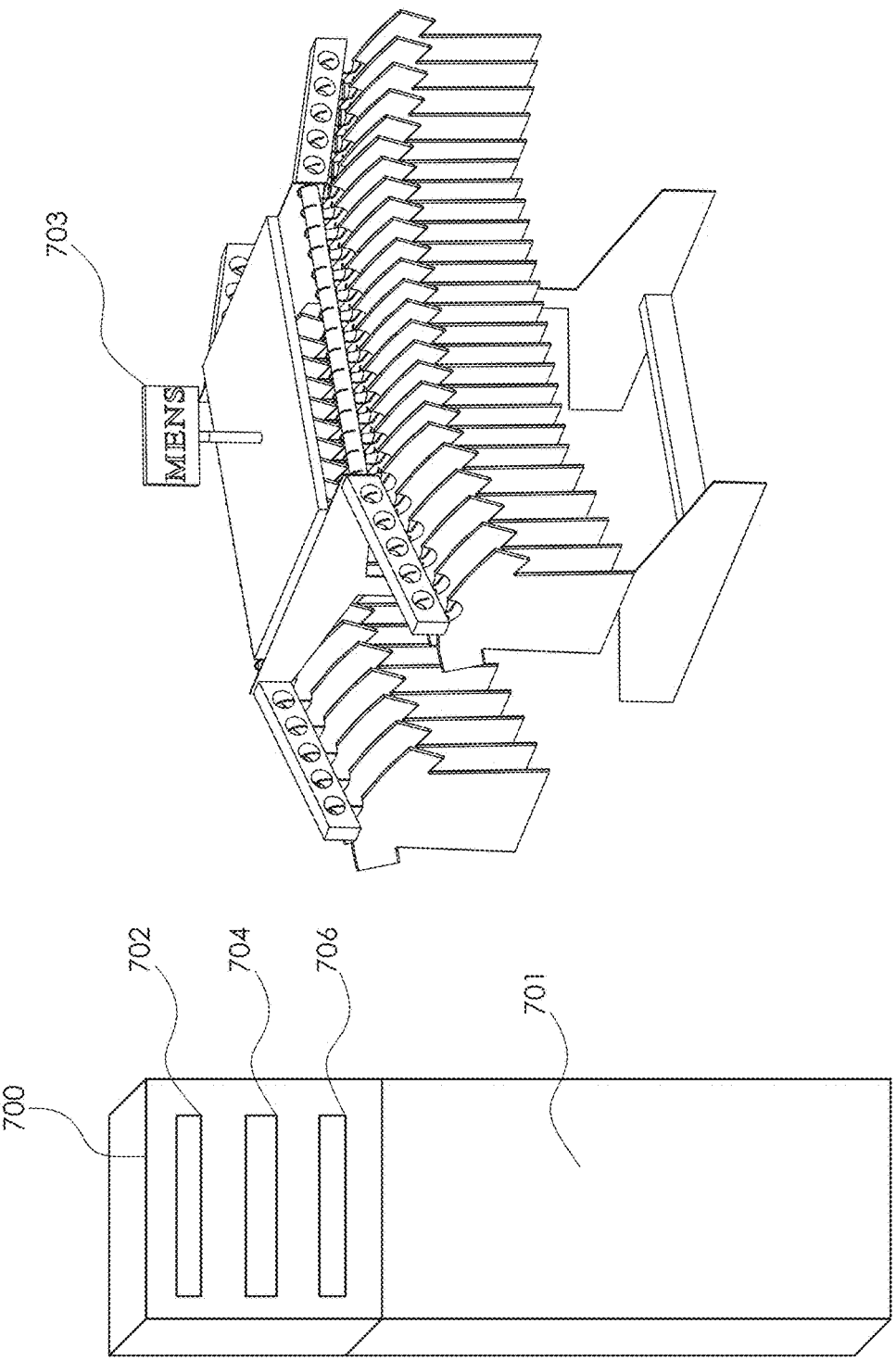
FIG. 7 illustrates an embodiment of a mood-based clothing selector.

While an on-line retailer of other types of content, including clothes, shoes and food may be able to use a similar type of selection system, the content delivery will be different from digital art due to the physical nature of the goods involved, Hence, the end user may use mood selection for on-line ordering and then have the goods distributed by more traditional means, such as the United States Postal Service, UPS and Federal Express. In a bricks and mortar clothing store, however, the selection and distribution interface described above in FIG. 6 may be totally inappropriate. Clothing stores tend to group different types of cloths in different parts of physical stores, so one or more of the subcategories may already be satisfied by the nature of the groupings. However, different styles and colors of the same types of clothes may be comingled, so having the ability to use these as subcategories may be helpful. In addition, it may be desirable to have the selection system close to the groups of clothes, so small computerized monitor 700 of FIG. 7 could be mounted on a wall, rack, kiosk, etc. 701, near the one or more groups 703 upon which the user could make selections, which might include a different type of mood range 702 than that identified in FIG. 6 and present the user with no subcatgories or different positive subcategory 704 and negative subcategory 706, such as size, style, color, etc., than those identified in FIG. 6.

Instead of presenting the end user with downloadable content, the end user may be given a list of letters and/or numbers that identify where on nearby racks clothing items meeting the criteria may be found, such as Rack 3, Area B, which includes a portion of a rack of clothes that are all size X, of style Y and color Z and that reflect the mood(s) of the end user. As grouping clothing in this manner may not be practical, and is subject to end users removing clothing from one rack to putting it back in a different rack, clothing stores may desire to use a conveyor system 800 of FIG. 8, which is similar to the type of moving rack used in a dry cleaner store, where all of the clothes are hung at different numbered locations on a rotating rack. The selection system 802 may identify clothing items 37, 129 and 195, which may then be delivered to the user by turning the rotating rack 800 to each numbered clothing items 804 until the selection system 802 identified numbers 804 have been delivered. Such a system would make it possible for a clothing retailer to identify the same piece of clothing by multiple moods, just like art content, and subcategories, thereby offering greater flexibility for the retailer and end users alike.

Figure 9:
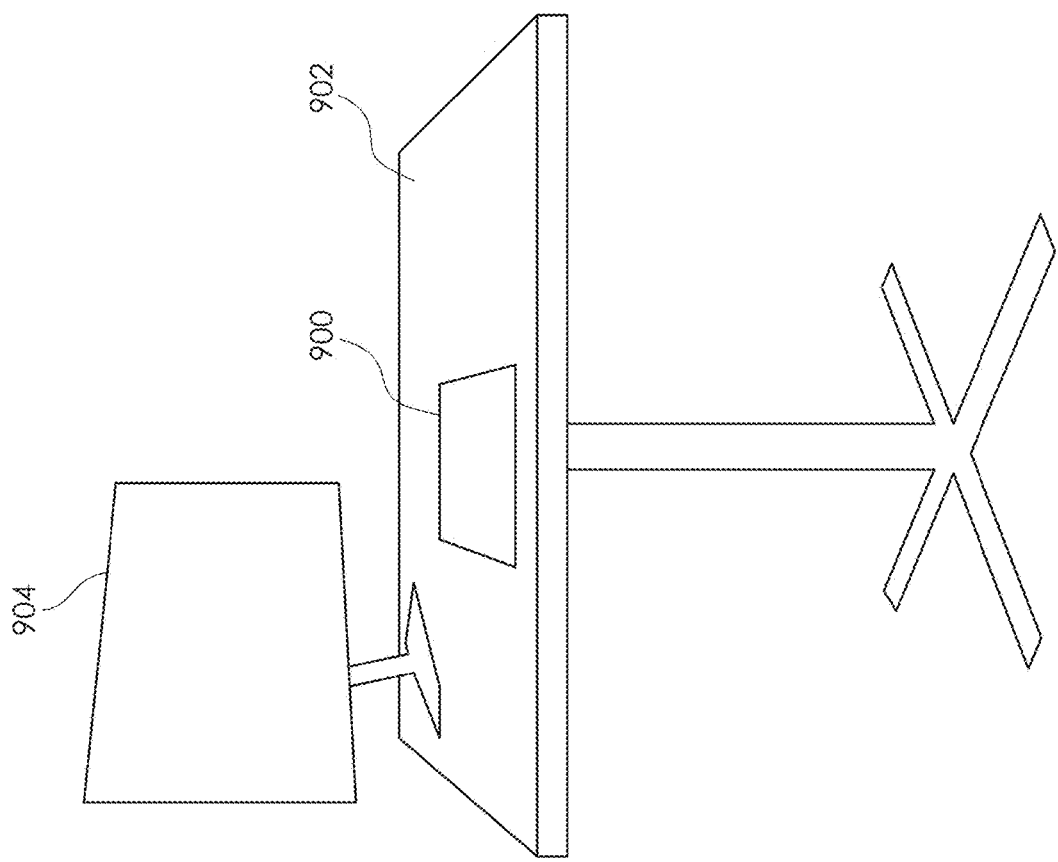
FIG. 9 illustrates an embodiment of a mood-based menu selector.

Food is identified and organized in restaurants and stores in many different ways and while the traditional menu is still popular, more and more stores are offering electronic menus, as illustrated in FIG. 9, either in the form of monitors 900 built into a table 902 or within non-removable stands 904 at the table 902. This type of menu may allow restaurants to mood identify their offerings and for end users to select food to be ordered based on mood selection and subcategories, versus or in addition to more traditional organizational presentations, i.e., beverages, starters, soups, salads, entrees and desserts. Fast food menus are already electronic in many stores, so adding mood identification to offerings and mood selection to such menus would be relatively straightforward. Adding mood selection options in grocery stores presents complications similar to those of clothing stores, where food items are categorized in traditional manners that are not necessarily conducive to rearrangement, but list-based selection systems, such as that described in U.S. Pat. No. 7,424, 447, make it possible for an end user to create a list of desired items from a store in advance of shopping and for the location of available items to be identified by isle location or map before or upon entering the store. Adding mood selection to the options available to the end user of such a list-based selection system could be done using one or more of the mood range interfaces noted above and including mood identification in the store's inventory system along with other information.

Figure 10:
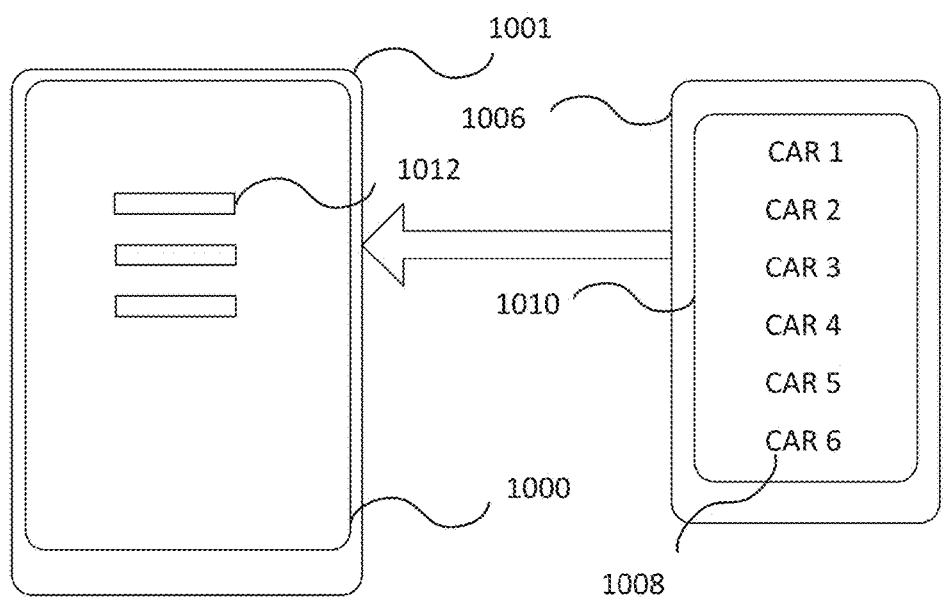
FIG. 10 illustrates an embodiment of a mood-based automobile selector.

Mood identification and mood selection could be utilized for a vast amount of other types of content, such as automobile dealerships, pet stores, coffee shops, sporting goods stores, etc., in a similar manner. Services, such as spa services, hair salons, theatre shows, theme park rides, and numerous other services, may also be similarly mood identified and mood selected. So as to make it easier for different types of content providers to utilize mood identification and mood selection, as illustrated in FIG. 10, an application 1000 operating on a mobile device 1001 may be utilized to provide retailers with a mood identification system and the same application 1000, operating in different mode, or a different mobile device application, may be utilized to provide end users with mood selection.

On the retailer side, the application 1000 may be designed to receive, through a data port of the mobile device 1001 inventory content from each retailer based on standard inventory system 1006 data outputs for their type of business. For example, for a car dealer, the data outputs from the inventory system 1006 may include the vehicle identification number (VIN), make, model, car type (sedan, compact, SUV, etc.), engine size, colors, etc., for each car 1008 in the inventory 1010. Using the interface to the mood identifier 1012 of the application 1000, the retailer would then identify the perceived mood(s) for each car.

On the end user side, the application 1000 may provide the end user with an interface for a mood selection system 1012 that operates in a manner similar to that described above, whereby the end user is able to identify one or more moods through range area selection and the system generates a span corresponding to each range area selected. Once the one or more moods have been selected by the end user, positive and negative subcategories may then be selected by the end user, or subcategories could be selected first followed by one or more moods. The application 1000 would receive the mood identified inventory data from the retailer over the Internet (perhaps in advance of shopping), through a data port at the retailer's facility, or wirelessly upon entering the retailer's facility with the mobile device 1001 enabled with the application 1000. Naturally, the retailer's mobile device and the end user's mobile device need not be the same device. The retailer need not even use a mobile device application, but rather an application written for a more complicated desktop or server-based system, but retailers could still provide end users that did not bring their own devices to the retailer's facility to borrow mobile devices while shopping.

Figure 11:
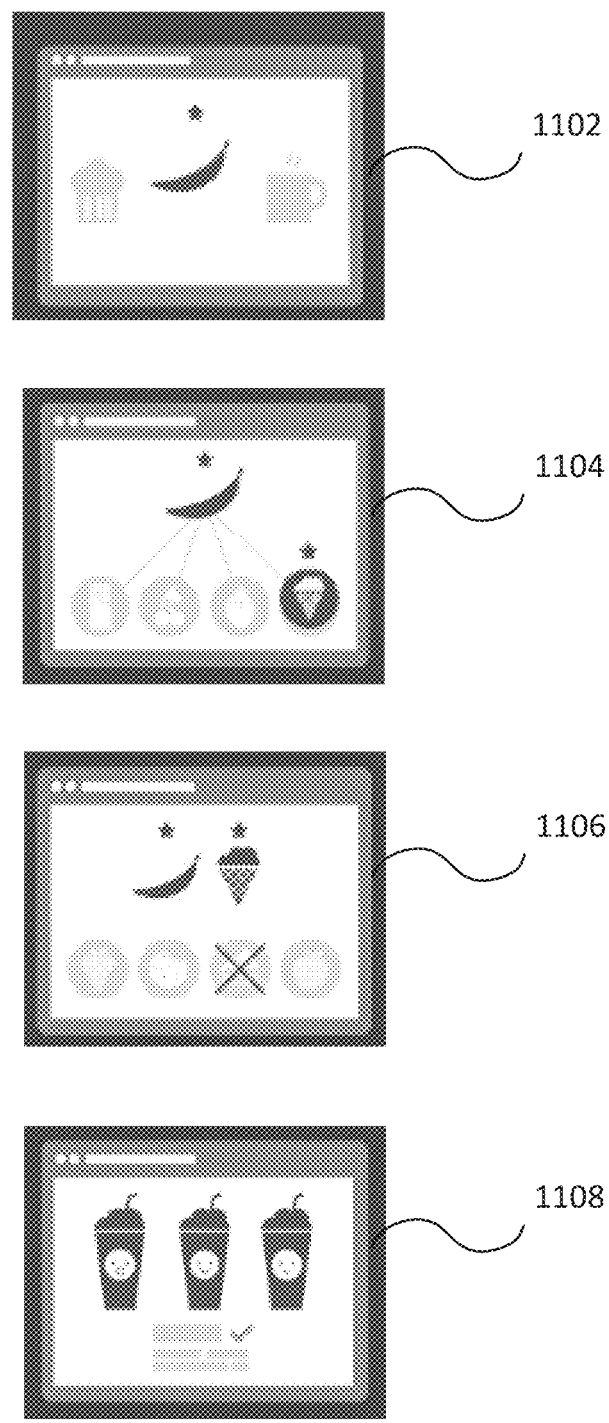
FIG. 11 illustrates an embodiment of a mood-based food selector.

In addition to the range/span selection systems described above, other mood-based selection system and user interfaces are possible, such as one based on sensory moods, such as images, sounds or smells, versus word moods. With respect to a mood-based image system, a user could be presented with a number of images and prompted to pick an image that corresponds with the mood they are in or want to be in once they have completed the selection process and obtained the product or service they desire. Using food as an example, the user could be presented with images of different food items and asked to pick one that corresponds to the desired mood. Hence, the images are used in place of words that describe the moods and the images are carefully selected for the type of mood that the depicted items tend to create in people. For example, using the food example, the images could be a muffin, a banana and a coffee/tea cup, as illustrated in interface screen 1102 of FIG. 11. Muffins tend to be sweet, rich, and a little decadent, so a muffin may connote moods such as satisfied, blissful or full. Bananas tend to be used as healthy, energy foods before someone does something, like go on a run or start the day, due to the simple sugars and potassium they contain, so a banana may connote moods such as hopeful, optimistic and rejuvenated. A cup of coffee/tea tends to make people think about being awake, energized or bouncy. Sounds and smells could be used in the same manner; guiding users into to thinking along the lines of one or more moods.

As with other forms of mood-based selection systems described above, once a user has selected a main mood, the user may then be prompted to select sub-moods, subcategories, or positive/negative limitations to further refine the selection process. Returning to the prior example, if the user had selected the banana, the user may then be presented with additional images associated with a subcategory or sub-mood, such as a chocolate bar, a strawberry and an ice cream cone, as shown in interface screen 1104. Mixing chocolate with a banana takes the user's mood in a more certain direction, i.e., desert-like items, as does more fruit, such as a strawberry, i.e., very healthy items, but the ice cream could go a couple of very different directions, such as towards a dessert or towards a still-healthy snack.

Let's assume the user selected the ice cream in the above example. Negative limitations, in the form of images, may then be used to help direct the system in one direction or another. The negative limitation images may include an apple, a cookie and a piece of pie, as shown in interface screen 1106. If the user selects the piece of pie as a negative limitation, the selection system will know not to suggest a food item that is more dessert-like. Hence, the selection system may process the main mood of a banana, with a submood of ice cream and a negative limitation of pie and end up suggesting three different fruit shakes that include bananas and ice cream, as shown in interface screen 1108. While this is just one example of sensory moods being used in a selection system, other examples of sensory moods system may include purely sound, such as a music selection system, purely smells, such as a perfume selection system, or some combination of different sensory inputs that may help to prompt a user's selection of a good or service.

Figure 12:
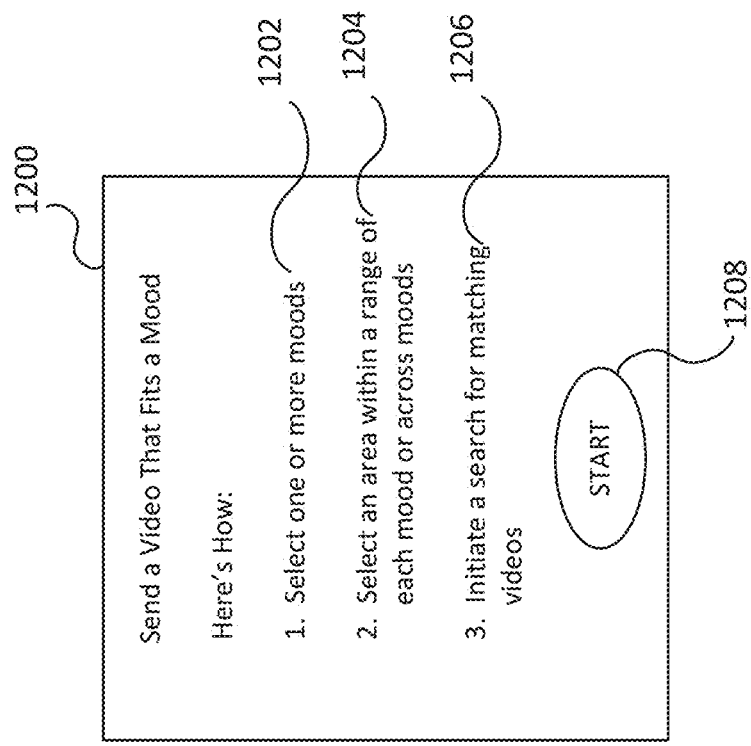
FIG. 12 illustrates an embodiment of a mood-based video selector.

One additional embodiment of an application for this computer-implemented mood identification and selection system, the "system", is a system for a form of electronic greetings that uses short videos in place of animated greetings or other electronic greetings. In accordance with an embodiment, as illustrated in FIG. 12, a user may access a website, or similar type of user interface tool 1200, connected to a network or computer system, and initiate a search for videos. The initial screen of the interface tool 1200 illustrated in FIG. 12 may provide instructions for how to use the system, or simply take users directly into the search function; how users get to the search function is not important to the current embodiment. As shown in FIG. 12, the interface tool 1200 invites the user to "Send a Video that Fits a Mood—Here's How:" and proceeds to explain the steps explained above to the user in terms of selecting one or more moods, 1202, selecting ranges, 1204, and initiating a search, 1206. Selecting the START button 1208 would take the user to another screen that includes the mood selector with which the user chooses, which then starts the range area selection and/or span selection processes described above.

Once a user has searched for and identified a video the user wants to send, the user could enter an email address for the recipient, possibly include a personal greeting of some form and cause the video to be sent to the user. Due to file size and bandwidth limitations, and a desire by the operator of the system to control the content, the video itself would likely not be sent to the recipient, but rather a link to the video or some other device that enabled the recipient to be streamed the video without the ability to download or more permanently store the video. Rather than sending videos as greeting cards, other embodiments are possible, such as searching for content to view or listen to, performing research, or many other purposes. And, again, while visual and aural content are primarily described herein the mood identification and mood selection techniques described herein could be used for any type of content.

The type of videos to be used for the greeting system described above could be any type of fairly short video for which moods have been identified, or video content (or other content) specifically created to evoke certain moods. For example, a video specifically intended to convey an energetic mode may be filled with short quips of different people or objects in the act of performing different actions, such as clapping hands, shooting an arrow, breaking apart, starting up, etc., where each depicted action conveys a certain amount of energy. A video specifically intended to convey a somber or reflective mood may be comprised of images of a person travelling, but rather than showing the more exciting and energetic aspects of travelling, the video may convey the negative space, waiting for luggage or a car, sitting on a ship crossing a body of water, walking through old quiet buildings, etc. A video specifically intended to create a happy or whimsical mood may picture a person flying on a chair through the streets of a city and how people react to seeing this person flying on the chair. A video specifically intended to create an eager or motivated mood may picture someone going through the motions of preparing for some important event by getting cleaned and polished and dressed for that event. There are many ways in which video content, particularly short video content that is capable of keeping the viewer's attention throughout the video, may be specifically created to convey intended moods, instead of being created first and then being mood identified.

As noted above, relatively short video content, such as video around five minutes or less in length, and even as short as less than one minute, may be better suited for conveying specific moods to viewers than longer videos, that have to employ various tricks to maintain a user's attention for longer periods of time. For example, longer video content such as television shows and movies generally require some type of story line for people to follow or they lose interest. While longer videos depicting nature scenes, such as rivers, mountains, seaside, rain falling in forests, etc., and including serene music may not have a story line, but such videos all tend to only be useful as a background visual and sound for playing on a television in place of background music in some other form. With little activity of interest being conveyed, most viewers quickly lose attention and interest.

Short video identified by mood or specifically created to convey a mood is different from longer, more traditional video, and can be used for different purposes. For example, if a certain chain of clothing stores want to energize shoppers and get them excited about being in the store and looking at the store's goods, then the store may choose to play a loop of short videos that convey particular moods that create the desired moods in those shoppers, i.e., conducive to buying cloths. Even if shoppers pay relatively little attention to the video, because each one is relatively short and infused with the mood being conveyed, a shopper would only need to see a small amount of the video to feel the mood being conveyed and to likewise be affected. Conversely, other goods and services providers, such as doctor's office, spas, etc., may wish to create other moods, such as calming moods, happy moods, contemplative moods, somber moods, etc. Short videos could also be played in night clubs, bars, elevators, hotel rooms, etc., each time conveying differently desired mood effects.

The manner in which such videos may be distributed, as noted above, may vary greatly and somewhat depends on the nature of the video and moods being conveyed. For example, a single video related to a single mood or topic may be distributed on its own, such through an individual download or limited use link, as part of a greeting, incorporated into a presentation, or many other types of uses. Multiple videos related to the same mood or complementary moods may be distributed in a similar fashion, but also distributed on disc or DRAM device. A series of videos may also be used to extend a topic from one video to another or one series of videos to another series of videos.

To the degree it may be necessary to provide advertising in association with one or more videos in order to generate income from the video distribution, the advertising may be provided in a variety of different ways. Traditional pre-roll, mid-roll and post-roll advertising formats may be used, as with television broadcast, although the advertisements may be shorter when utilized with video. Alternatively, the advertising may be integrated into the content of the video so that the advertising is more subliminal than blatant. For example, a storefront business offering certain products may pay for a short video to be produced that conveys a certain desired mood and which features their store and/or their products in some manner, such as showing someone walking past the store, going into the store, coming out of the store with one of their products, etc. Integrated advertising could be simple and singular or quite extensive and woven throughout the video. In addition, a company's products or services could be integrated into a video without first obtaining any payment or authorization from the company, but obtaining some compensation from the company after the fact.

Figure 13:
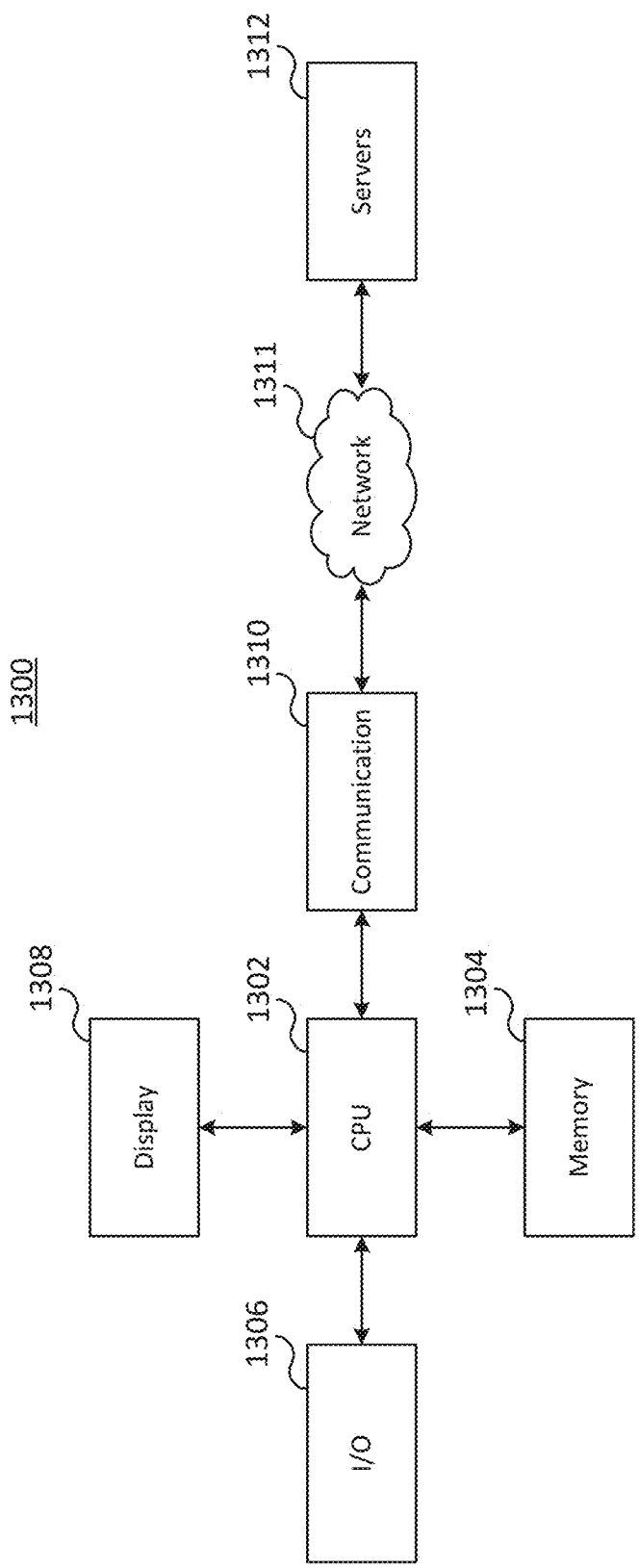
FIG. 13 illustrates an embodiment of an identification and selection system.

FIG. 13 illustrates an embodiment of a computer-implemented mood identification and search system 1300 as described herein. The system 1300 includes at least central processing unit or processor 1302 and non-transitory memory 1304 connected to the processor 1302. Also connected to the processor 1302 is one or more input/output devices 1306, such as a mouse, printer, scanner, point tool, user-interactive screen, etc., a display 1308, such as for providing the user interfaces described above, and a communication controller and link 1310. The link 1310 may be connected to a network 1311, such as the Internet, which is in turn connected to one or more servers 1312 for storing and delivering video content and the like. As disclosed herein, the system 1300 could operate independent of the network 1311 and servers 1312 or operate in conjunction with them, such as in a client/server type of arrangement.

A number of computing systems have been described throughout this disclosure, such as in FIG. 13. The descriptions of these systems are not intended to limit the teachings or applicability of this disclosure. Further, the processing of the various components of the illustrated systems may be distributed across multiple machines, networks, and other computing resources. For example, each module of the selection system may be implemented as separate devices or on separate computing systems, or alternatively as one device or one computing system. In addition, two or more components of the selection system may be combined into fewer components. Further, various components of the illustrated systems may be implemented in one or more virtual machines, rather than in dedicated computer hardware systems. Likewise, the data repositories shown may represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Depending on the embodiment, certain acts, events, or functions of any of the algorithms described herein may be performed in a different sequence, may be added, merged, or left out altogether (e.g., not all described acts or events are necessary for the practice of the algorithms). Moreover, in certain embodiments, acts or events may be performed concurrently, e.g., through multi-threaded processing, interrupt processing, or multiple processors or processor cores or on other parallel architectures, rather than sequentially.

The systems and techniques described above can be implemented on the computing devices described and associated with a user (e.g., a subject, a contributor, or any other persons described herein above). In an embodiment, the user may be a machine that is programmed to follow a path, a plurality of computing devices associated with a plurality of users, a server in communication with the computing device(s), or a plurality of servers in communication with the computing device(s). Additionally, the techniques may be distributed between the computing device(s) and the server(s). For example, the computing device may collect and transmit raw data to the server that, in turn, processes the raw data to generate a map. FIG. 13 describes a computing system that includes hardware modules, software module, and a combination thereof and that can be implemented as the computing device and/or as the server.

In a basic configuration, such as that illustrated in FIG. 13, the computing system may include at least a processor, a system memory, a storage device, input/output peripherals, communication peripherals, and an interface bus. The interface bus is configured to communicate, transmit, and transfer data, controls, and commands between the various components of the personal electronic device. The system memory and the storage device comprise non-transitory computer readable storage media, such as RAM, ROM, EEPROM, hard-drives, CD-ROMs, optical storage devices, magnetic storage devices, flash memory, and other tangible storage media, but specifically excluding transitory signals. Any of such computer readable storage medium can be configured to store instructions or program codes embodying aspects of the disclosure. Additionally, the system memory may comprise an operating system and applications. The processor is configured to execute the stored instructions and can comprise, for example, a logical processing unit, a microprocessor, a digital processor, and the like.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each selection system described herein may be implemented by one or more computing devices, such as one or more physical servers programmed with associated server code.

Further, the input and output peripherals include user interfaces such as a keyboard, screen, touch screens, microphone, speaker, other input/output devices, and computing components such as digital-to-analog and analog-to-digital converters, graphical processing units, serial ports, parallel ports, and universal serial bus. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface that the user can use to provide input to the computing system and to receive an output from the computing system. This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

In an embodiment, a non-transitory computer readable storage medium comprises instructions for enabling a user to select one or more items from a plurality of items, the medium comprising instructions that, when executed on a computer system, cause the computer system to at least access through the computer system the plurality of items for selection by the user, present through a user interface of the computer system to the user one or more mood identifiers for selection by the user, each mood identifier among the one or more mood identifiers representing an intensity of at least a mood, each item among the plurality of items having been assigned one or more pre-determined mood identifiers by an entity other than the user, search with the computer system the plurality of items having pre-determined mood identifiers corresponding to the one or more mood identifiers selected by the user, and present to the user through the user interface a list of items corresponding to the one or more items where the order of the list of items is based on a level of correspondence between the one or more mood identifiers selected by the user and the pre-determined mood identifiers assigned to the items.

In the embodiment, wherein the level of correspondence for each mood identifier is a fraction wherein a mood identifier selected by the user is the numerator and a pre-determined mood identifier assigned to an item is the denominator. In the embodiment, wherein the mood identifier includes one or more of an image, a sound or an odor. In the embodiment, wherein the one or more mood identifier presented to the user for selection is filtered based on pre-established criteria that reduces a potential for outlier selections by the user. In the embodiment, wherein the plurality of items include representations of one or more of analog content, digital content, literary content, video content, music content, food items, clothing items, vehicles and services.

In the embodiment, further comprising instructions that cause the computer system to present through the user interface one or more categories associated with the one or more items for selection by the user that will limit the plurality of items to a distinct group of items. In the embodiment, wherein the one or more categories are positive categories that identify the distinct group of items that the user wants included among the one or more items. In the embodiment, wherein the one or more categories are negative categories that identify the distinct group of items that the user wants excluded among the one or more items.

In the embodiment, wherein an organization and structure of the user interface is based on the one or more items. In the embodiment, wherein each mood is represented through the user interface by a shape, and wherein the mood identifier is represented through the user interface in relation to the shape. In the embodiment, wherein the shape is a bar and the mood identifier is represented by a portion of the bar. In the embodiment, wherein the shape includes a plurality of objects and the mood identifier is represented by a subset of objects among the plurality of objects. In the embodiment, wherein the mood identifier is represented within or along the shape. In the embodiment, wherein a mood identifier represents the intensity of two or more moods, wherein each mood is represented through the user interface by a shape, and wherein the mood identifier is represented through the user interface by portions of two or more shapes.

In an embodiment, a computer system for enabling a user to select one or more items from a plurality of items comprises a processor, a storage system for storing the plurality of items, and a display having a user interface controlled by the processor for enabling the user to access the plurality of items in the storage system, the user interface presenting the user with one or more mood identifiers for selection by the user, each mood identifier among the one or more mood identifiers representing an intensity of at least a mood, each item among the plurality of items having been assigned one or more pre-determined mood identifiers by an entity other than the user, the user interface enabling the user to perform search using the processor through the plurality of items in the storage system to identify items having pre-determined mood identifiers corresponding to the one or more mood identifiers selected by the user, the user interface presenting to the user a list of items corresponding to the one or more items where the order of the list of items is based on a level of correspondence between the one or more mood identifiers selected by the user and the pre-determined mood identifiers assigned to the items.

In the embodiment, wherein the plurality of items include one or more of analog content, digital content, literary content, video content, and music content. In the embodiment, further comprising a physical structure for housing the display, wherein at least a portion of the storage system is separate from the physical structure, and wherein the plurality of items include representations of one or more of food items, household items, clothing items, transportation items, and services. In the embodiment, wherein the physical structure is a mobile device. In the embodiment, wherein the plurality of items are representations of items within an inventory. In the embodiment, wherein the user interface further presents to the user one or more categories associated with the one or more items for selection by the user that will limit the plurality of items to a distinct group of items, wherein the one or more categories include positive categories that identify the distinct group of items that the user wants included among the one or more items, and wherein the one or more categories include negative categories that identify the distinct group of items that the user wants excluded among the one or more items.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of certain of the disclosures herein.

What is claimed:

1. A non-transitory computer readable storage medium comprising instructions for enabling a user to select one or more items from a plurality of items, the medium comprising instructions that, when executed on a computer system, cause the computer system to at least:

access through the computer system the plurality of items for selection by the user;

present through a user interface of the computer system to the user one or more selectable mood identifiers for selection by the user, wherein each selectable mood identifier among the one or more selectable mood identifiers includes a first range of intensities of at least one mood;

enable the user to select a first point within the first range;

automatically generate a first span around the first point, the first span including a first subrange of additional points within at least the first range on at least one side of the first point;

in response to the user selection, search with the computer system the plurality of items, each item among the plurality of items having been assigned one or more pre-determined mood identifiers by an entity other than the user, wherein each pre-determined mood identifier among the one or more pre-determined mood identifiers includes a second span representing a set of additional points within at least a second range of intensities of at least one mood;

as a result of the search, generate a list of items corresponding to the one or more items where the order of the list of items is based on a level of correspondence between at least the first span of the one or more selectable mood identifiers selected by the user and at least the second span of the pre-determined mood identifiers assigned to the items; and present to the user through the user interface the list of items.

2. The non-transitory computer readable storage medium as recited in claim 1, wherein the level of correspondence is expressed as a fraction wherein a selectable mood identifier selected by the user is the numerator and a pre-determined mood identifier assigned to an item is the denominator.

3. The non-transitory computer readable storage medium as recited in claim 1, wherein the selectable mood identifier and the pre-determined mood identifier further includes one or more of an image, a sound or an odor.

4. The non-transitory computer readable storage medium as recited in claim 1, wherein the one or more selectable mood identifier presented to the user for selection is filtered based on pre-established criteria that reduces a potential for outlier selections by the user.

5. The non-transitory computer readable storage medium as recited in claim 1, wherein the plurality of items include representations of one or more of analog content, digital content, literary content, video content, music content, food items, clothing items, vehicles and services.

6. The non-transitory computer readable storage medium as recited in claim 1, further comprising instructions that cause the computer system to present through the user interface one or more categories associated with the one or more items for selection by the user that will limit the plurality of items to a distinct group of items.

7. The non-transitory computer readable storage medium as recited in claim 6, wherein the one or more categories are positive categories that identify the distinct group of items that the user wants included among the one or more items.

8. The non-transitory computer readable storage medium as recited in claim 6, wherein the one or more categories are negative categories that identify the distinct group of items that the user wants excluded among the one or more items.

9. The non-transitory computer readable storage medium as recited in claim 1, wherein an organization and structure of the user interface is based on the one or more items.

10. The non-transitory computer readable storage medium as recited in claim 1, wherein each mood is represented through the user interface by a shape, and wherein the one or more selectable mood identifiers are represented through the user interface in relation to the shape.

11. The non-transitory computer readable storage medium as recited in claim 10, wherein the shape is a bar and the one or more selectable mood identifiers are represented by a portion of the bar.

12. The non-transitory computer readable storage medium as recited in claim 10, wherein the shape includes a plurality of objects and the one or more selectable mood identifiers are represented by a subset of objects among the plurality of objects.

13. The non-transitory computer readable storage medium as recited in claim 10, wherein the one or more selectable mood identifiers are represented within or along the shape.

14. The non-transitory computer readable storage medium as recited in claim 1, wherein the one or more selectable mood identifiers and the one or more pre-determined mood identifiers represent the intensity of two or more moods, wherein each mood is represented through the user interface by a shape, and wherein the one or more selectable mood identifiers and the one or more pre-determined mood identifiers are represented through the user interface by portions of two or more shapes.

15. A computer system for enabling a user to select one or more items from a plurality of items, comprising:

a processor;

a storage system for storing the plurality of items; and a display having a user interface controlled by the processor for enabling the user to access the plurality of items in the storage system, the user interface presenting the user with one or more selectable mood identifiers for selection by the user, wherein each selectable mood identifier among the one or more selectable mood identifiers includes a first range of intensities of at least one mood and enabling the user to select a first point within the first range, the processor automatically generating a first span around the first point, the first span including a first subrange of additional points within at least the first range on at least one side of the first point, in response to the user selection, the processor searching the plurality of items in the storage system, each item among the plurality of items having been assigned one or more pre-determined mood identifiers by an entity other than the user, wherein each pre-determined mood identifier among the one or more pre-determined mood identifiers includes a second span representing a set of additional points within at least a second range of intensities of at least one mood, as a result of the searching, the processor generating a list of items corresponding to the one or more items where the order of the list of items is based on a level of correspondence between the at least the first span of one or more selectable mood identifiers selected by the user and at least the second span of the pre-determined mood identifiers assigned to the items, and the processor presenting to the user through the user interface the list of items.

16. The computer system as recited in claim 15, wherein the plurality of items include one or more of analog content, digital content, literary content, video content, and music content.

17. The computer system as recited in claim 15, further comprising a physical structure for housing the display, wherein at least a portion of the storage system is separate from the physical structure, and wherein the plurality of items include representations of one or more of food items, household items, clothing items, transportation items, and services.

18. The computer system as recited in claim 17, wherein the physical structure is a mobile device.

19. The computer system as recited in claim 15, wherein the plurality of items are representations of items within an inventory.

20. The computer system as recited in claim 15, wherein the user interface further presents to the user one or more categories associated with the one or more items for selection by the user that will limit the plurality of items to a distinct group of items, wherein the one or more categories include positive categories that identify the distinct group of items that the user wants included among the one or more items, and wherein the one or more categories include negative categories that identify the distinct group of items that the user wants excluded among the one or more items.

* * * * *